(12) United States Patent
Shimazu et al.

(10) Patent No.: US 11,526,699 B2
(45) Date of Patent: Dec. 13, 2022

(54) DETECTING DEVICE, DETECTING METHOD, GENERATING METHOD, COMPUTER PROGRAM, AND STORAGE MEDIUM

(71) Applicant: SHIMANO Inc., Sakai (JP)

(72) Inventors: Hayato Shimazu, Sakai (JP); Yasuhiro Nakashima, Sakai (JP); Noriko Masuta, Sakai (JP)

(73) Assignee: Shimano Inc., Sakai (JP)

( * ) Notice: Subject to any disclaimer, the term of this patent is extended or adjusted under 35 U.S.C. 154(b) by 321 days.

(21) Appl. No.: 16/900,711

(22) Filed: Jun. 12, 2020

(65) Prior Publication Data

US 2020/0394467 A1 Dec. 17, 2020

(30) Foreign Application Priority Data

Jun. 14, 2019 (JP) .............................. JP2019-111495

(51) Int. Cl.
| | |
|---|---|
| *G06K 9/62* | (2022.01) |
| *G06Q 10/00* | (2012.01) |
| *G05B 13/02* | (2006.01) |
| *B62J 50/21* | (2020.01) |
| *G06Q 30/06* | (2012.01) |
| *G06Q 10/06* | (2012.01) |

(52) U.S. Cl.
CPC ............ *G06K 9/6262* (2013.01); *B62J 50/21* (2020.02); *G05B 13/0265* (2013.01); *G06K 9/6256* (2013.01); *G06K 9/6267* (2013.01); *G06Q 10/20* (2013.01); *G06Q 30/0633* (2013.01); *G06Q 10/06316* (2013.01)

(58) Field of Classification Search
CPC .. G06K 9/6262; G06K 9/6267; G06K 9/6256; G06K 9/00671; G06K 2209/23; G06Q 10/20; G06Q 30/0633; G06Q 10/06316; G05B 13/0265; B62J 50/21; B62J 50/22; G06T 7/0002; G06T 2207/20081; G06T 2207/20084; G06T 2207/30164; G06N 3/08

USPC ......................................................... 382/159

See application file for complete search history.

(56) References Cited

U.S. PATENT DOCUMENTS

| | | | |
|---|---|---|---|
| 7,819,032 B2 | 10/2010 | Watari et al. | |
| 9,227,697 B2 | 1/2016 | Matsumoto et al. | |
| 9,928,544 B1* | 3/2018 | Hasan | ..................... G06T 11/00 |
| 2017/0276199 A1* | 9/2017 | Yabusaki | .............. B60T 17/221 |
| 2017/0323161 A1* | 11/2017 | Du | ...................... G08B 13/1672 |
| 2019/0047440 A1* | 2/2019 | Morita | ..................... G01C 3/22 |
| 2019/0120722 A1* | 4/2019 | Wakasugi | ............. G01M 17/02 |

OTHER PUBLICATIONS

Chao (Machine learning tutorial Dec. 2011) (Year: 2011).*

* cited by examiner

*Primary Examiner* — Juan A Torres
(74) *Attorney, Agent, or Firm* — Alleman Hall Creasman & Tuttle LLP

(57) ABSTRACT

Provided are a detecting device, a detecting method, a generating method, and a computer-readable storage medium that allow the user to readily obtain information on the degree of wear for a worn portion in the human-powered vehicle. A detecting device includes a control unit that detects a worn portion in a human-powered vehicle as a target worn portion from a first image including at least a part of the human-powered vehicle and outputs wear information related to a degree of wear for the target worn portion.

31 Claims, 17 Drawing Sheets

DETECTING DEVICE, DETECTING METHOD, GENERATING METHOD, COMPUTER PROGRAM, AND STORAGE MEDIUM

CROSS-REFERENCE TO RELATED APPLICATIONS

The subject application claims priority to Japanese Pat. App. Ser. No. 2019-111495, filed Jun. 14, 2019, the entire contents of which are hereby incorporated by reference for all purposes.

TECHNICAL FIELD

The present invention relates to a detecting device, a detecting method, a generating method, and a computer-readable storage medium that detect a part of a human-powered vehicle from an image thereof.

BACKGROUND ART

Human-powered vehicles mounted with components including a front derailleur, a rear derailleur, a seat post, a suspension, or the like have been known. A technique of making a diagnosis by connecting a diagnostic device to a component of the human-powered vehicle has been known (see Patent Documents 1 and 2).

PRIOR ART DOCUMENT

Patent Document

[Patent Document 1] U.S. Pat. No. 7,819,032
[Patent Document 2] U.S. Pat. No. 9,227,697

SUMMARY OF INVENTION

Problems to be Solved by Invention

Currently, it is required to provide means for allowing the user to more readily obtain information related to a worn portion of a human-powered vehicle.

It is an object of the present invention to provide a detecting device, a detecting method, a generating method, and a computer-readable storage medium that allow the user to readily obtain information on the degree of wear for a worn portion in the human-powered vehicle.

Means for Solving Problems

A detecting device according to the first aspect of the present invention comprises a control unit including processing circuitry. The control unit is configured to detect, in a first image including at least a part of a human-powered vehicle, a worn portion of the human-powered vehicle that is classified as a worn portion and output wear information related to a degree of wear for the detected target worn portion.

According to the present aspect, the user can readily obtain the degree of wear for a worn portion in the human-powered vehicle from the image of the human-powered vehicle.

In a detecting device according to the second aspect of the present invention, the worn portion is one of a plurality of worn portions in the first image, the target worn portion is one of a plurality of defined target worn portions, and the control unit detects the plurality of worn portions in the human-powered vehicle from the first image as the plurality of target worn portions, and outputs associated wear information for each of the plurality of detected target worn portions.

According to the present aspect, the user can readily obtain wear information for each of the plurality of worn portions.

In a detecting device according to the third aspect of the present invention, the worn portion includes a component of the human-powered vehicle, and the control unit detects a component of the human-powered vehicle from the first image as the target worn portion.

According to the present aspect, the user can readily obtain the wear information of the component from the image of the human-powered vehicle.

In a detecting device according to the fourth aspect of the present invention, the component includes at least one of a brake shoe, a brake pad, a sprocket assembly, a crank assembly, a chain, a tire, a disk brake rotor, a rim, and a wire.

According to the present aspect, the user can obtain the degree of wear from the image regarding at least one of the brake shoe, brake pad, sprocket assembly, crank assembly, chain, tire, disk brake rotor, rim, and wire of the human-powered vehicle.

In a detecting device according to the fifth aspect of the present invention, the control unit outputs wear information for the detected target worn portion by a machine learning model trained to output the wear information in response to a run-time input of an image.

According to the present aspect, the detecting device can output the wear information by the trained machine learning model.

In a detecting device according to the sixth aspect of the present invention, a training computing device trains the machine learning model with training data obtained by labeling training data images including at least one of a brake shoe, a brake pad, a disk brake rotor, and a rim with a degree of abrasion.

According to the present aspect, the detecting device can output the information on the degree of abrasion from an image of at least one of the brake shoe, brake pad, disk brake rotor, and rim.

In a detecting device according to the seventh aspect of the present invention, a training computing device trains the machine learning model with training data obtained by labeling training data images including at least one of a sprocket assembly and a crank assembly with a degree of abrasion.

According to the present aspect, the detecting device can output the information on the degree of abrasion from an image of at least one of the sprocket assembly and the crank assembly.

In a detecting device according to the eighth aspect of the present invention, a training computing device trains the machine learning model with training data obtained by labeling training data images including at least one of a chain and a wire with a degree of extension.

According to the present aspect, the detecting device can output the information on the degree of extension from an image of at least one of the chain and the wire.

In a detecting device according to the ninth aspect of the present invention, a training computing device trains the machine learning model with training data obtained by labeling training data images including a tire with a depth of ridges.

According to the present aspect, the detecting device can output the information on the degree of wear in association with the depth of the ridges from an image including the tire.

In a detecting device according to the tenth aspect of the present invention, a training computing device trains the machine learning model with training data including a plurality of training data images obtained when the worn portion is viewed from different angles.

According to the present aspect, the detecting device can generate the trained machine learning model that outputs the degree of wear for the worn portion in the human-powered vehicle in accordance with the multiple images related to the human-powered vehicle.

In a detecting device according to the eleventh aspect of the present invention, at run-time, the machine learning model outputs the wear information in response to run-time input of the first image and user information including physical information or attribute information of a user of the human-powered vehicle.

According to the present aspect, the detecting device can generate the trained machine learning model that outputs the degree of wear for the worn portion in the human-powered vehicle in accordance with the image of the human-powered vehicle and the physical information of the user of the human-powered vehicle.

In a detecting device according to the twelfth aspect of the present invention, the control unit outputs a second image in which the target worn portion is featured.

According to the present aspect, the user can intuitively recognize the detected worn portion.

In a detecting device according to the thirteenth aspect of the present invention, the control unit changes a visual emphasis of the target worn portion depending on the wear information.

According to the present aspect, the user can intuitively recognize the degree of wear in the detected target worn portion.

In a detecting device according to the fourteenth aspect of the present invention, the control unit outputs related information related to the detected target worn portion.

According to the present aspect, the user can obtain the related information related to the detected target worn portion from the image of the human-powered vehicle.

In a detecting device according to the fifteenth aspect of the present invention, the related information includes at least one of information on a type of the target worn portion, an installing method for a component related to the target worn portion, a removing method for a component related to the target worn portion, and an adjusting method for a component related to the target worn portion.

According to the present aspect, the user can obtain the information on at least one of the type, installing method, removing method, and adjusting method related to the target worn portion of the human-powered vehicle from an image including at least a part of the human-powered vehicle.

In a detecting device according to the sixteenth aspect of the present invention, the information on the installing method includes at least one of information on a component related to the target worn portion for installing a component in the worn portion, and information on a tool for installing or removing a component related to the target worn portion.

According to the present aspect, the user can obtain the information on at least one of the component and the tool corresponding to the target worn portion in the human-powered vehicle from the image of the human-powered vehicle.

In a detecting device according to the seventeenth aspect of the present invention, the related information includes information on a replacement to be replaced with a component related to the target worn portion.

According to the present aspect, the user can obtain the information on a replacement corresponding to the target worn portion in the human-powered vehicle from the image of the human-powered vehicle.

In a detecting device according to the eighteenth aspect of the present invention, the information on a replacement includes information on another component required when a component related to the target worn portion is replaced with the replacement.

According to the present aspect, the user can obtain from the image of the human-powered vehicle the information on the component required if replacement with a replacement corresponding to the target worn portion in the human-powered vehicle is performed.

In a detecting device according to the nineteenth aspect of the present invention, the related information includes link information to access a web site for purchasing an item related to the target worn portion detected.

According to the present aspect, the user can obtain a necessary item for the target worn portion with simple operation.

In a detecting device according to the twentieth aspect of the present invention, the control unit outputs the related information as text data and/or graphical data.

According to the present aspect, the user can obtain the related information related to the target worn portion as text data and/or graphical data from the image of the human-powered vehicle.

A detecting device according to the twenty-first aspect of the present invention further comprises a display unit that displays information output from the control unit.

According to the present aspect, the user can visually recognize the degree of wear for the target worn portion by the display unit.

In a detecting device according to the twenty-second aspect of the present invention, the display unit receives user input of selected related information related to the target worn portion, and the control unit outputs detailed information of the selected related information.

According to the present aspect, the user can select information about the worn portion to be displayed in a more detailed manner regarding the degree of wear for the target worn portion detected from the image of the human-powered vehicle and obtain the detailed information.

In a detecting device according to the twenty-third aspect of the present invention, the display unit is configured to select the target worn portion as a selected worn portion on a second image in which the target worn portion is featured, and the control unit outputs related information of the selected worn portion.

According to the present aspect, the user can select information about the worn portion to be displayed in a more detailed manner from the second image displayed in a highlighted manner on the image of the human-powered vehicle and obtain the detailed information.

A detecting device according to the twenty-fourth aspect of the present invention further comprises a storage device that stores information output from the control unit.

According to the present aspect, the detecting device can store the information related to the degree of wear for the worn portion in the human-powered vehicle.

In a detecting device according to the twenty-fifth aspect of the present invention, the control unit stores identification information of the target worn portion in the storage device in association with information related to the degree of wear.

According to the present aspect, the detecting device can store the information related to the target worn portion in the human-powered vehicle in association with the degree of wear.

In a detecting device according to the twenty-sixth aspect of the present invention, the control unit stores identification information of the target worn portion in the storage device in association with identification information of a user of the human-powered vehicle.

According to the present aspect, the detecting device can store the information related to the target worn portion in the human-powered vehicle and the degree of wear in association with the information for identifying the user.

In a detecting device according to the twenty-seventh aspect of the present invention, the control unit outputs identification information of the target worn portion in association with the information related to the degree of wear to an external device.

According to the present aspect, the detecting device can output to the external device, for example, a cloud server, the identification information of the target worn portion in the human-powered vehicle in association with the information related to the degree of wear.

In a detecting device according to the twenty-eighth aspect of the present invention, the control unit outputs identification information of the target worn portion in association with identification information of a user of the human-powered vehicle to an external device.

According to the present aspect, the detecting device can output to the external device, for example, a cloud server, the identification information of the worn portion in the human-powered vehicle and the degree of wear in association with the information for identifying the user.

In a detecting device according to the twenty-ninth aspect of the present invention, the control unit outputs information for prompting a user to input the first image in accordance with a traveling history of the human-powered vehicle.

According to the present aspect, the user can more surely obtain the information related to the degree of wear for the worn portion.

In a detecting device according to the thirtieth aspect of the present invention, the control unit outputs to an external device the first image inputted, in association with a traveling history of the human-powered vehicle.

According to the present aspect, the detecting device can output to the external device, for example, a cloud server, the image including the worn portion in the human-powered vehicle in association with the traveling history of the human-powered vehicle.

In a detecting device according to the thirty-first aspect of the present invention, the control unit outputs to an external device the first image as input, in association with traveling environment information indicating traveling environment of the human-powered vehicle.

According to the present aspect, the detecting device can output to the external device, for example, a cloud server, the image including the target worn portion in the human-powered vehicle in association with the traveling environment under which the human-powered vehicle travels.

The present invention may be achieved as a detecting device having the above-described characteristic elements described above as well as a detecting method of executing each characteristic processing, a computer including a processor to execute such characteristic processing, a generating method for a trained machine learning model, and a computer-readable storage medium.

A detection method executable by a processor according to the thirty-second aspect of the present invention comprises: detecting a worn portion in a human-powered vehicle from a first image including at least a part of the human-powered vehicle as a target worn portion, and outputting wear information related to a degree of wear for the target worn portion.

According to the present aspect, the user can readily obtain the degree of wear for a target worn portion in the human-powered vehicle from the image of the human-powered vehicle.

A method for generating a machine learning model according to the thirty-third aspect of the present invention comprises: creating training data obtained by labeling a plurality of training data images, each including at least a part of a human-powered vehicle, with a worn portion of the human-powered vehicle and a degree of wear, and generating, based on the created training data, a machine learning model that detects a worn portion of the human-powered vehicle in response to input of a run-time input image of at least a portion of the human-powered vehicle, as a target worn portion from the image and that outputs the target worn portion and a degree of wear.

According to the present aspect, the trained machine learning model outputs the worn portion in the human-powered vehicle and the degree of wear can be generated from the inputted image.

A computer-readable storage medium according to the thirty-fourth aspect of the present invention comprises instructions configured to be executed by a processor of a computer, to cause the processor to execute processing steps of detecting a worn portion in a human-powered vehicle as a target worn portion from a first image including at least a part of the human-powered vehicle, and outputting wear information related to a degree of wear for the target worn portion.

According to the present aspect, the user can readily obtain the degree of wear for a worn portion in the human-powered vehicle from the image of the human-powered vehicle.

According to the present aspect, the computer program is read by the computer, whereby the computer functions as a device that outputs the degree of wear for the worn portion in the human-powered vehicle in accordance with the image of the human-powered vehicle.

Effects of Invention

According to the present disclosure, the detecting device allows the user to readily obtain information on the degree of wear for a worn portion in the human-powered vehicle from the image of the human-powered vehicle without using a special diagnostic device.

MODE FOR CARRYING OUT INVENTION

The descriptions of the embodiments below are examples of forms that an output device according to the present invention can take, though there is no intention to limit the forms. The output device according to the present invention can take forms different from the embodiments, such as forms of modification of each of the embodiments and a combination of at least two modifications that do not contradict each other.

In the following description of each of the embodiments, the terms indicating directions, such as front, back, forward, backward, left, right, sideways, upper, lower and so on are used with reference to the directions shown as the user sits in the saddle of a human-powered vehicle.

Embodiment 1

Figure 1:
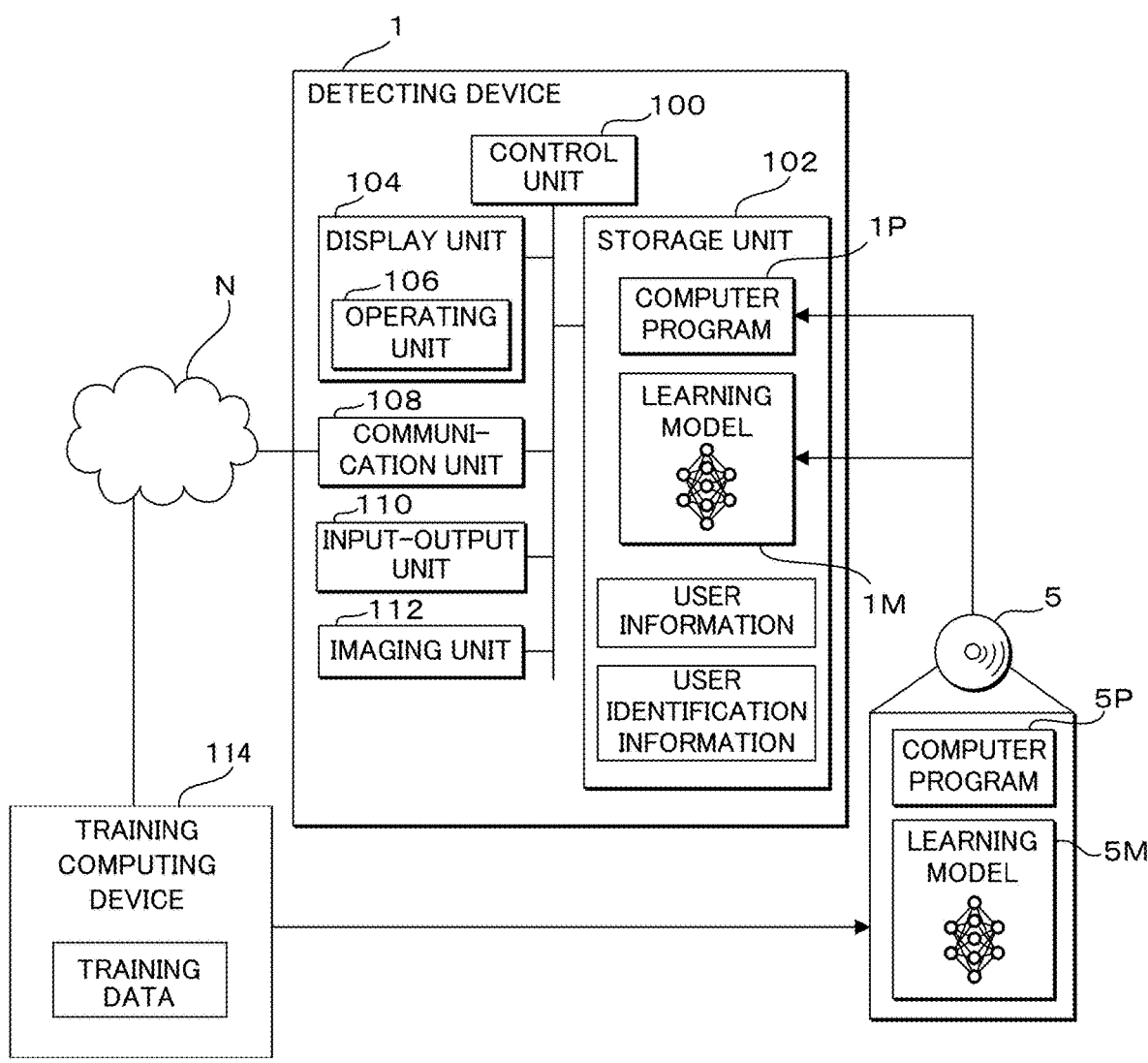
FIG. 1 is a block diagram illustrating the configuration of a detecting device in Embodiment 1.

FIG. 1 is a block diagram illustrating the configuration of a detecting device 1 in Embodiment 1. The detecting device 1 is a smartphone in the first example. The detecting device 1 is a tablet terminal in the second example. The detecting device 1 may be a wearable information terminal that takes the shape of glasses in the third example. The detecting device 1 includes a control unit 100, a storage unit (i.e., a storage device) 102, a display unit 104, a communication unit 108, an input-output unit 110 and an imaging unit 112.

The control unit 100 includes processing circuitry, e.g. a processor utilizing a central processing unit (CPU) and/or a graphics processing unit (GPU). The control unit 100 executes processing by using a memory such as a built-in read only memory (ROM), a random access memory (RAM) and so on. The control unit 100 detects a worn portion in the human-powered vehicle as a target worn portion in a first image including at least a part of the human-powered vehicle, and outputs wear information related to the degree of wear for the target worn portion. As described below, the control unit 100 detects multiple worn portions of the human-powered vehicle from the first image as multiple target worn portions, and outputs wear information for each of the multiple target worn portions.

The storage unit 102 includes a non-volatile memory, such as a flash memory, for example. The storage unit 102 stores a computer program 1P. The control unit 100 reads out and executes the computer program 1P. The computer program 1P is provided from the parts maker of the human-powered vehicle or is delivered from any distribution server, and is installed in the detecting device 1, which is a general purpose computer. The computer program 1P causes the computer to execute processing of detecting a worn portion in the human-powered vehicle as a target worn portion from a first image including at least a part of the human-powered vehicle, and outputting wear information related to the degree of wear for the target worn portion. The computer program 1P may be obtained by the control unit 100 reading out a computer program 5P stored in a computer-readable storage medium 5 and copying it onto the storage unit 102. Although a CD ROM is depicted in FIG. 1, it will be appreciated that the computer-readable storage medium 5 is typically a non-volatile memory, such as FLASH memory.

The storage unit 102 stores a machine learning model 1M. The learning model 1M is trained on a training data set during a training phase by a training computing device 114. Although training computer 114 is depicted as a separate computing device from detecting device 1, it will be appreciated that in some configurations these two devices could be the same computing device. The training computing device 114 is in communication with the detecting device 1 via a network N. The trained machine learning model is downloaded to the detecting device via the network N and stored in the computer-readable storage medium 5. The learning model 1M is trained to output the wear information for the target worn portion in accordance with input of an image. The control unit 100 outputs the wear information by the trained machine learning model 1M. The learning model 1M may be obtained by the control unit 100 reading out a learning model 5M stored in the storage medium 5 and copying it onto the storage unit 102. Although the storage medium 5 is depicted as a CD-ROM obtained from the training computer as a data source, it will be appreciated that it may be any suitable non-volatile storage device, such as FLASH memory, etc. Further, the learning model 5M and computer program 5P may alternatively be stored at and downloaded from a server device such as training computer 114 via a computer network N, instead of being installed using storage media 5. At run-time, which is the time at which a user employs the trained machine learning model on the detecting device 1 to recognize objects in an image of the human powered vehicle, the control unit 100 is configured to receive a first image as input and output identification information that identifies the object as the target object and a confidence value of the identification of the object as the target object. This output may also be stored in storage unit 102, and exported to other computing devices via storage media 5 or computer network N.

The worn portion includes a component of the human-powered vehicle. The control unit 100 detects a component of the human-powered vehicle from the first image as a target worn portion. The component includes at least one of a brake shoe, a brake pad, a sprocket assembly, a crank assembly, a chain, a tire, a disk brake rotor, a rim, and a wire.

The storage unit 102 stores in advance wear information related to a target worn portion in the human-powered vehicle. The storage unit 102 stores information related to the type of the worn portion in the human-powered vehicle. The type is, for example, the type of a target worn portion, that is, the type of a component, and includes at least one of the brake shoe, brake pad, sprocket assembly, crank assembly, chain, tire, disk brake rotor, rim, and wire.

The storage unit 102 stores information to be outputted by the control unit 100 besides the information stored in advance. The storage unit 102 stores identification information of the user.

The identification information of the user includes a name, a nickname, a user ID, an e-mail address, or the like. The storage unit 102 stores user information related to the user. The user information includes at least one of physical information and attribute information of the user of the human-powered vehicle. The physical information includes the height and weight of the user, for example. The attribute information of the user is a gender or age, for example. The attribute information of the user may be information on a riding skill. The attribute information includes information related to a riding style and a life style favored by the user, for example.

The display unit 104 is a display device such as a liquid crystal panel, an organic electroluminescent display, or the like.

The display unit 104 displays information to be outputted from the control unit 100. In Embodiment 1, the display unit 104 displays the related information related to a part of the human-powered vehicle together with the image of the human-powered vehicle imaged by the imaging unit 112.

The display unit 104 includes an operating unit 106 that is an interface for accepting operation performed by the user. In the present embodiment, the operating unit 106 is a touch panel device included in the display unit 104. The operating unit 106 may be a physical button, a display built-in touch panel device, a speaker, a microphone, or the like.

The communication unit 108 is a communication module that can connect to communicate with a public communication network N. The control unit 100 can output information to an external device via the communication unit 108.

The input-output unit 110 is an interface to be connected to an external storage device or communication equipment. The input-output unit 110 is, for example, a universal serial bus (USB) interface.

The imaging unit 112 includes an image pickup device such as a complementary MOS (CMOS) image sensor, or the like. The imaging unit 112 outputs an image imaged by the image pickup device when activated. The imaging unit 112 images a still image or a dynamic image in accordance with an instruction from the control unit 100.

The control unit 100 in Embodiment 1 detects a worn portion of the human-powered vehicle by using the learning model 1M. The control unit 100 inputs a first image obtained by imaging the human-powered vehicle to the learning model 1M, detects the shown human-powered vehicle as well as a component as a target worn portion of the human-powered vehicle, and outputs wear information related to the degree of wear for the detected worn portion. Detection processing using the learning model 1M will be described in detail below.

Figure 2:
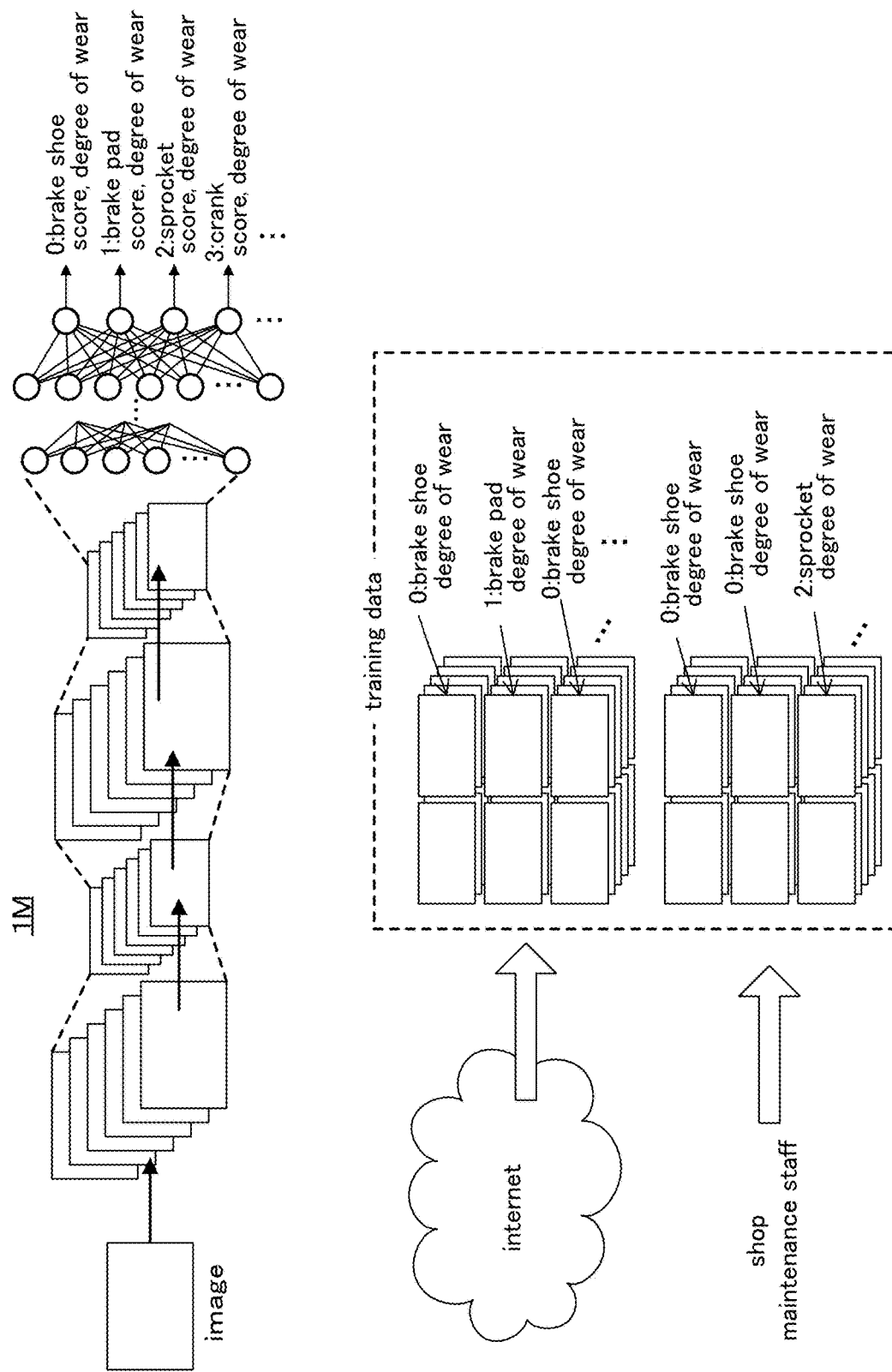
FIG. 2 illustrates the outline of a learning model in Embodiment 1.

The control unit 100 outputs wear information by the learning model 1M that has already been so trained as to output wear information for the target worn portion in accordance with input of an image. FIG. 2 illustrates the outline of the learning model 1M. The learning model 1M outputs the identification information of a component corresponding to a worn portion in the human-powered vehicle together with the degree of accuracy and the degree of wear by a supervised deep learning algorithm using a neural network (hereinafter referred to as NN) as illustrated in FIG. 2. The learning algorithm for the learning model 1M may be an unsupervised learning algorithm or a recurrent neural network (RNN).

As illustrated in FIG. 2, the NN of the learning model 1M includes multiple convolutional layers, multiple pooling layers and multiple fully connected layers that are defined by definition data, classifies the object shown in the inputted first image in accordance with the features of the inputted first image, and outputs identification information identifying the classification result and the degree of accuracy thereof.

The learning model 1M is trained by training data obtained by the control unit 100 labeling first images each including a worn portion of the human-powered vehicle collected via the Internet in advance in the detecting device 1 with the identification information of a worn portion shown in each of the first images and the degree of wear. The learning model 1M may have been generated by a model creating device managed by the business operator of the human-powered vehicle and have already been trained.

The learning model 1M may be trained in advance by training data based on rendering images generated according to an application program for design related to a component corresponding to a worn portion in the human-powered vehicle by the model creating device managed by the business operator of the human-powered vehicle.

The learning model 1M according to the present embodiment is generated in a generating method of creating training data obtained by labeling multiple first images each including at least a part of the human-powered vehicle with the identification information of a worn portion in the human-powered vehicle and the degree of wear, and of generating by the created training data a learning model that detects, when an image is inputted, a worn portion in the human-powered vehicle as a target worn portion from the image and that outputs the target worn portion and the degree of wear.

In the first example, the identification information of the component corresponding to a worn portion that is to be labeled with the image of the training data is information for identifying the type of a component of the human-powered vehicle. In FIG. 2, the first image including a brake shoe is labeled with "0," the first image including a brake pad is labeled with "1," and the first image including a sprocket assembly is labeled with "2."

In the second example, the identification information of an object that is to be labeled with the image of the training data corresponds to a model number of each component of the human-powered vehicle. Here, the first images each including a component that are labeled with respective model numbers are used as training data.

The control unit 100 trains the leaning model 1M such that it outputs wear information for the target worn portion in accordance with input of an image. In the first example, the control unit 100 trains the learning model 1M by training data obtained by labeling first images each including at least one of a brake shoe, a brake pad, a disk brake rotor and a rim with the identification information of these components for identifying them as well as the degree of abrasion.

In the second example, the control unit 100 trains the learning model 1M by training data obtained by labeling first images each including at least one of a sprocket assembly and a crank assembly with identification information for identifying the sprocket assembly and the crank assembly as well as the degree of abrasion.

In the third example, the control unit 100 trains the learning model 1M by training data obtained by labeling first images each including at least one of a chain and a wire with identification information for identifying the chain and the wire as well as the degree of extension.

In the fourth example, the control unit 100 trains the learning model 1M by training data obtained by labeling first images each including a tire with the depth of the ridges of the tire.

In the first to fourth examples, the control unit 100 may train the learning model 1M by the training data including multiple images obtained when a worn portion with the same degree of wear is viewed from multiple different angles.

The learning model 1M may be trained so as to identify all the above-described brake shoe, brake pad, sprocket assembly, crank assembly, chain, tire, disk brake rotor, rim and wire, or may be separately trained for each of the first example, the second example, the third example and the fourth example. Here, the learning model 1M may be constituted by a classifier for classifying the first image and a model for outputting the degree of wear for each classification.

Figure 3:
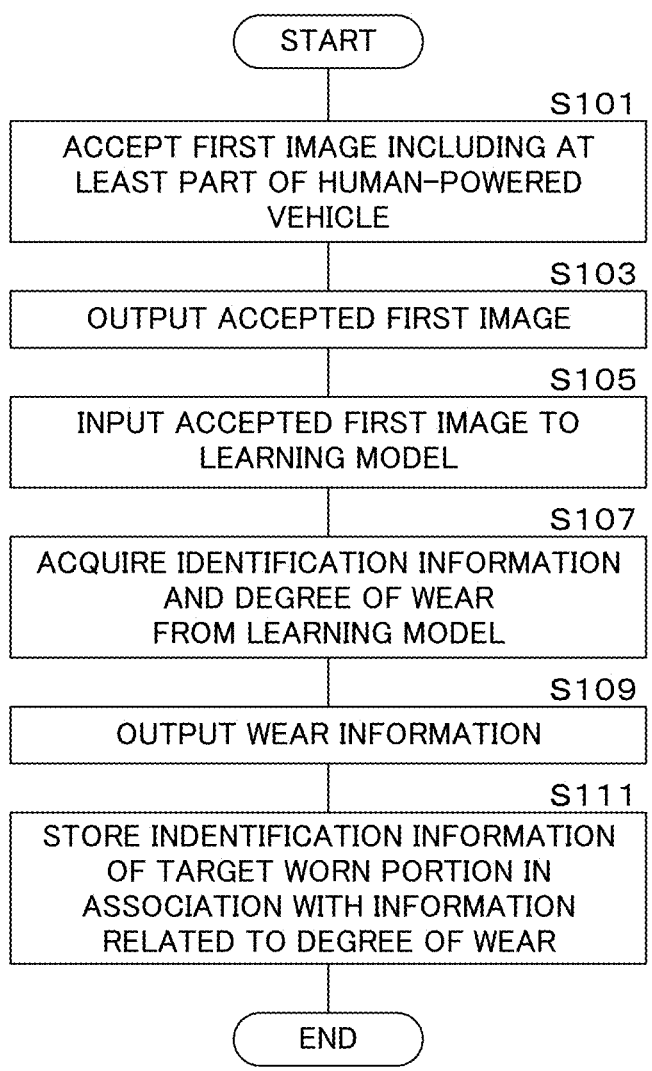
FIG. 3 is a flowchart showing one example of a detecting processing procedure performed by the detecting device in Embodiment 1.

The detection processing using the learning model 1M illustrated in FIG. 2 will be described with reference to a flowchart. FIG. 3 is a flowchart showing one example of a detection processing procedure performed by the detecting device 1. When the user carrying the detecting device 1, which is a smartphone, or a maintenance staff for the human-powered vehicle carrying the detecting device 1 activates the computer program 1P, the control unit 100 executes the following processing.

The control unit 100 accepts a first image including a human-powered vehicle (step S101). At step S101, the control unit 100 activates the imaging unit 112 to accept image output. Alternatively, having stored first images acquired by the imaging unit 112 in advance in the storage unit 102, the control unit 100 may read out a selected one of the first images from the storage unit 102 to accept the first image at step S101.

The control unit 100 outputs the accepted first image (step S103). At step S103, the control unit 100 causes the display unit 104 to display the first image.

The control unit 100 inputs the accepted first image to the trained learning model 1M (step S105). When the first image is inputted, the learning model 1 detects one or more worn portions in the human-powered vehicle as one or more target worn portions, and outputs the identification information of the target worn portions, the degree of accuracy and the degree of wear. The control unit 100 acquires the identification information outputted from the learning model 1M for which the degree of accuracy is equal to or more than a predetermined value and the degree of wear corresponding thereto (step S107).

The control unit 100 outputs wear information related to the target worn portion and the degree of wear (step S109). At step S109, the control unit 100 causes the display unit 104 to display text data or graphical data, such as a character string or an image, indicating the degree of wear as wear information. The control unit 100 may be so displayed that a character string indicating the wear information is superimposed on the first image. The wear information may be outputted to the external device via the input-output unit 110, or may be print output or voice output, not limited to be outputted to the display unit 104.

At step S109, the control unit 100 outputs the wear information for each worn portion in a selectable manner and outputs the wear information for the selected worn portion. The output example of the wear information will be described in detail with reference to FIG. 4.

The control unit 100 stores in the storage unit 102 the identification information of the target worn portion in association with the information on the degree of wear (step S111) and ends the processing.

Figure 4:
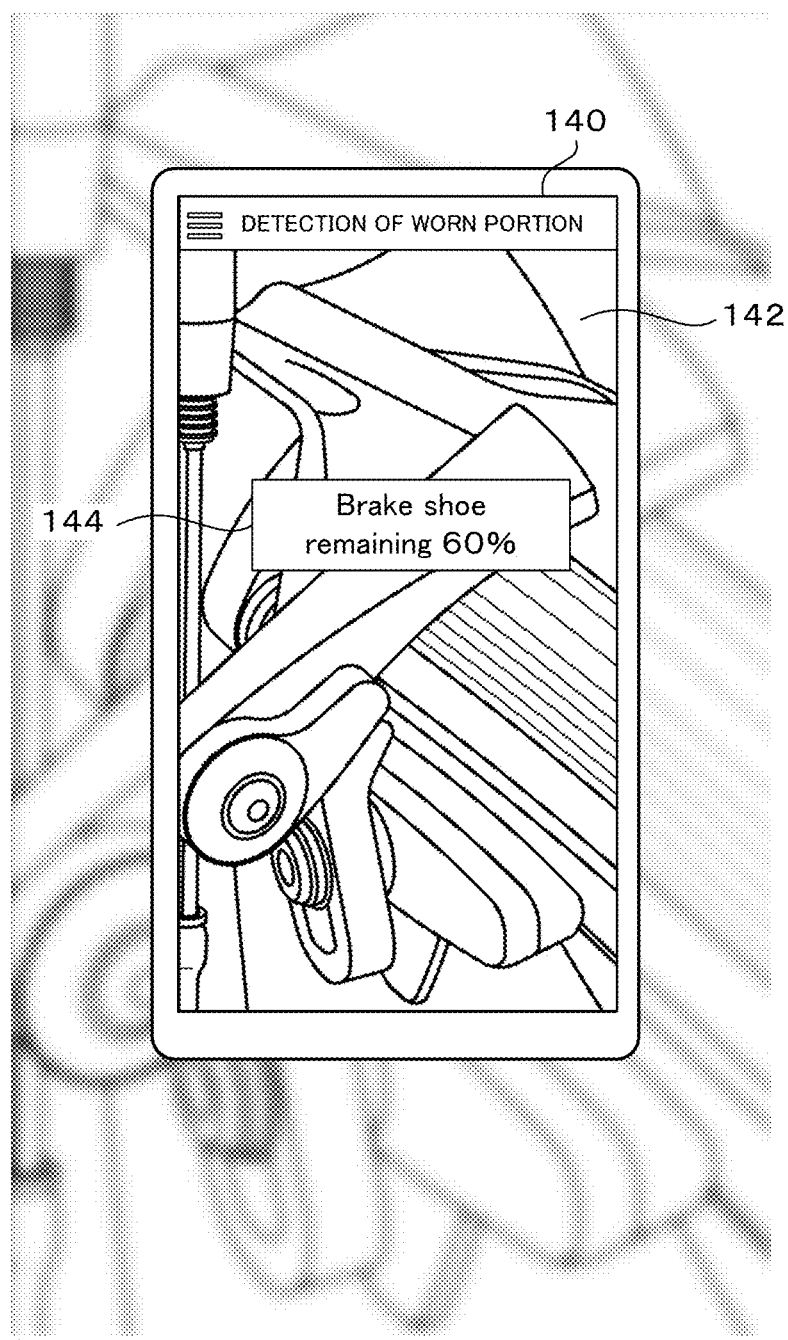
FIG. 4 illustrates an output example of wear information displayed on a display unit of the detecting device in Embodiment 1.

FIG. 4 illustrates a display example of the wear information displayed on the display unit 104 of the detecting device 1. FIG. 4 illustrates one example of an application screen 140 that is displayed on the display unit 104. The application screen 140 includes the first image 142 that is outputted to the display unit 104 at step S103. On the application screen 140, the wear information related to the degree of wear for the target worn portion is displayed as an object 144 including a character string so as to be superimposed on the first image 142.

In the example in FIG. 4, the target worn portion is a brake shoe, and a presumed value indicating a reduced amount of the braking surface is displayed as wear information. If the target worn portion is a tire, a presumed value of a reduced amount of the ridges is displayed as wear information.

If the target worn portion is a disk brake rotor, a presumed value of a reduced amount of the braking surface is displayed as wear information. If the target worn portion is a wire, a presumed value of the extension ratio is displayed as wear information.

As illustrated in FIG. 4, the control unit 100 may display the reduced amount determined from the degree of wear as wear information or may display a presumed value of the remaining amount. If the target worn portion is at least one of the sprocket assembly and the crank assembly as well, the control unit 100 may similarly display a presumed value.

The control unit 100 may detect a chain or a wire as a worn portion and output a recommended replacement time presumed from the extension ratio as wear information. The control unit 100 may detect a tire as a worn portion to display the depth of the ridges of the tire on a percentage basis as wear information.

The user can readily obtain the degree of wear for a worn portion in the human-powered vehicle from the image of the human-powered vehicle.

Embodiment 2

Figure 5:
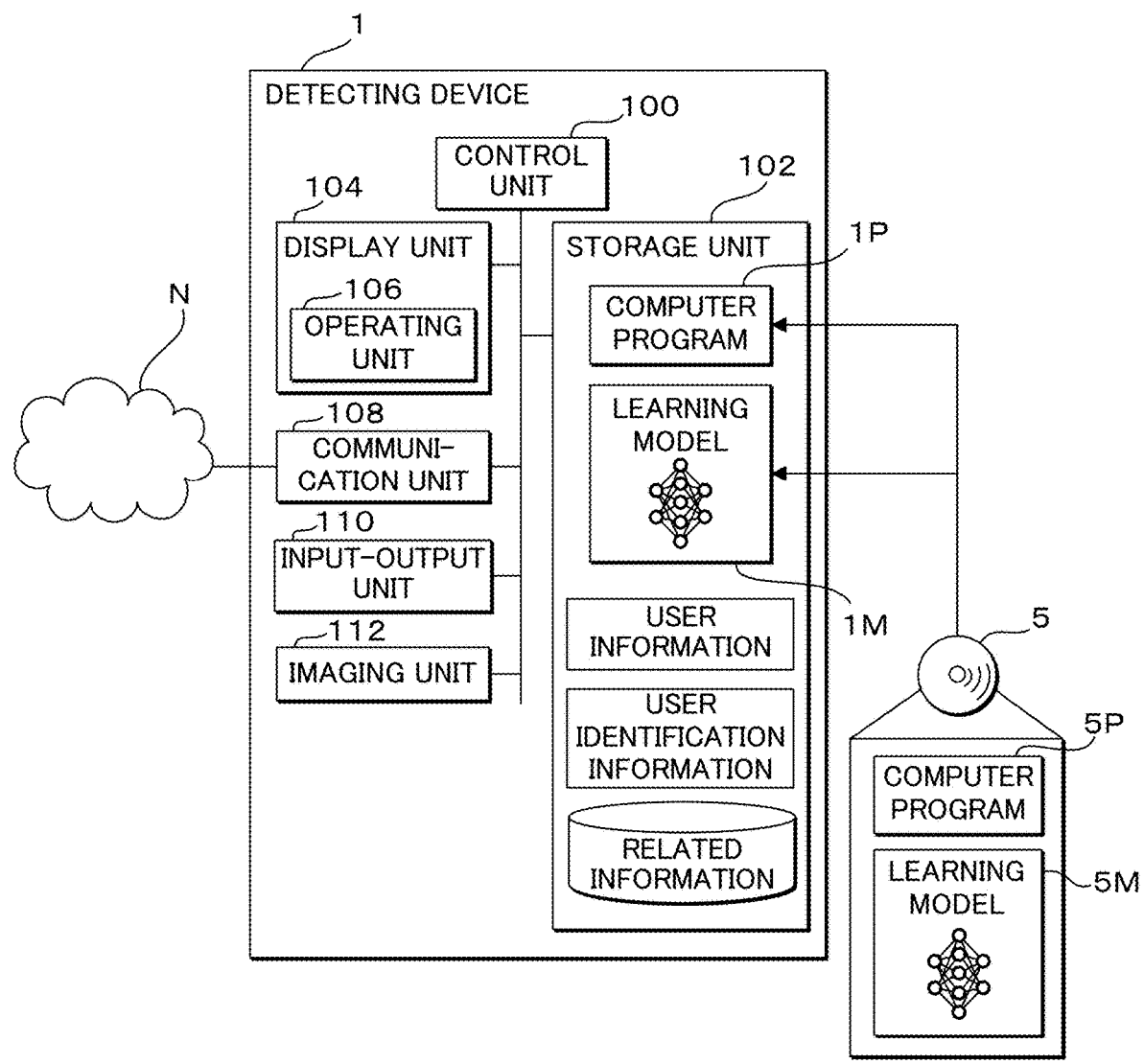
FIG. 5 is a block diagram illustrating the configuration of a detecting device in Embodiment 2.

FIG. 5 is a block diagram illustrating the configuration of the detecting device 1 in Embodiment 2. Since Embodiment 2 is similar in the hardware configuration of the detecting device 1 to Embodiment 1 except that the related information of a target worn portion is stored in the storage unit 102, common parts are denoted by similar reference codes and detailed description thereof will not be repeated.

The storage unit 102 of the detecting device 1 in Embodiment 2 stores related information related to a target worn portion. The control unit 100 outputs the related information related to the target worn portion. The related information includes at least one of information on the type of a target worn portion, an installing method for a component related to a target worn portion, a removing method for a component related to a target worn portion, and an adjusting method for a component related to a target worn portion.

The information on an installing method includes at least one of information on a component for installing a component related to a target worn portion in the worn portion and information on a tool required for installing or removing the component related to the target worn portion.

The related information may include information on a replacement for the component of a worn portion as related information related to the target worn portion. The information on a replacement includes information on another component that is required when the component of the worn portion is replaced with such a replacement. The related information may include link information for allowing the user to access a web site to purchase an item related to the worn portion as related information related to the target worn portion.

Figure 6:
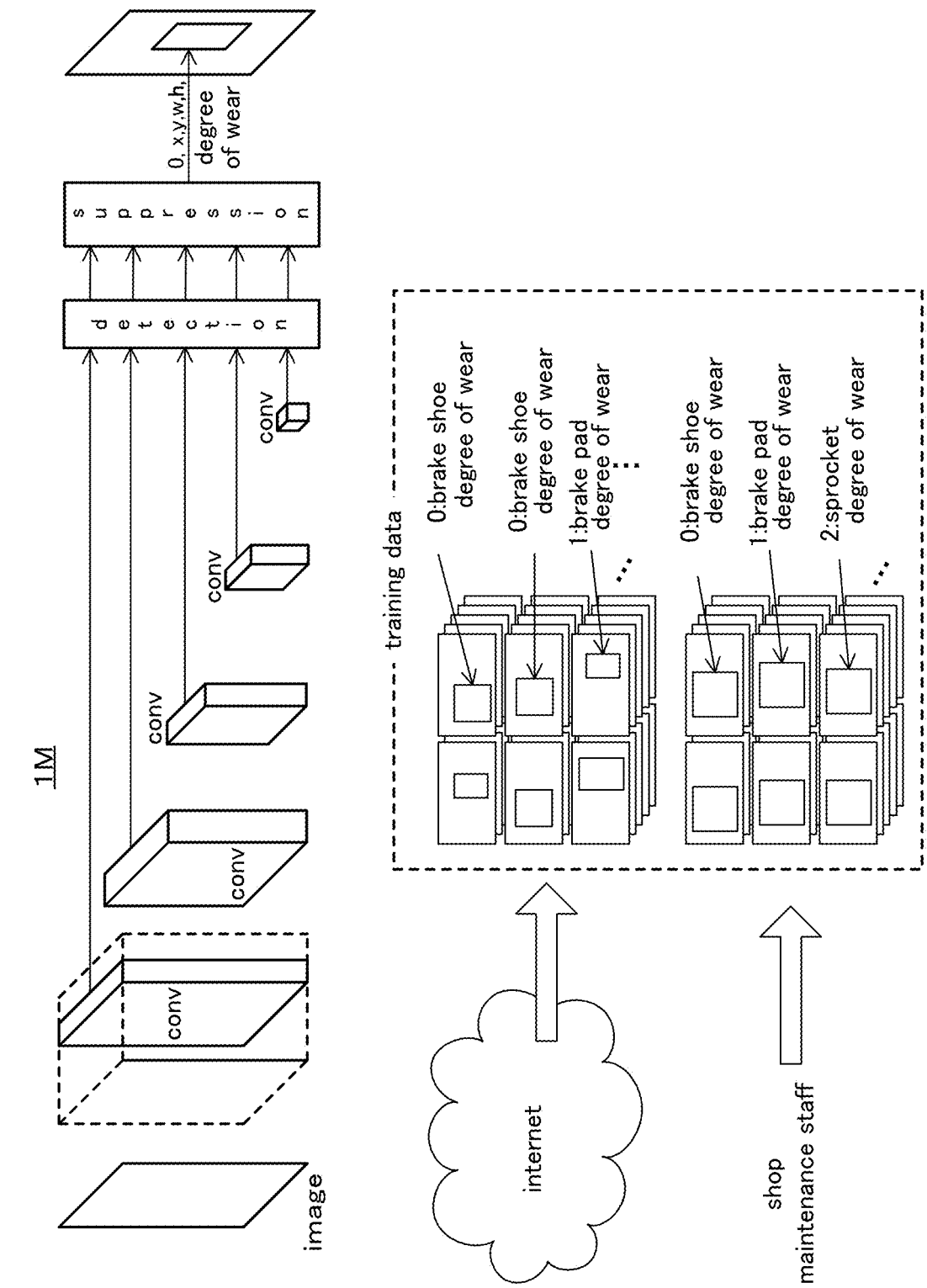
FIG. 6 illustrates the outline of a learning model in Embodiment 2.

The control unit 100 of the detecting device 1 in Embodiment 2 detects a worn portion shown in the first image together with the position within the first image in accordance with the learning model 1M. FIG. 6 illustrates the outline of the learning model 1M in Embodiment 2. The learning model 1M in Embodiment 2 is trained to output the position, within a first image, of an object related to the human-powered vehicle shown in the first image. Here, the learning model 1M is trained as a single shot multibox detector (SSD).

As illustrated in FIG. 6, the learning model 1M here splits the inputted first image into multiple channels, and outputs feature maps of multiple scales in a stepwise manner after convolutional processing or pooling processing. The learning model 1M outputs the candidate and the degree of accuracy of the detection range for each feature map output every multiple step, collects the candidates for the detection range that are outputted for every multiple step while excluding the duplicated candidate, and outputs the detection frame and the degree of accuracy, i.e. score, corresponding thereto.

The training data for training the learning model 1M in Embodiment 2 also includes the position, width and height of the box indicating the range of the object within the first image. The learning model 1M that also outputs the position of an object may be a model in accordance with R-CNN, YOLO, or the like, though not limited to the model in accordance with SSD.

The learning model 1M for detecting the worn portion inclusive of the position illustrated in FIG. 6 as well is trained by training data obtained by labeling first images each including a part of the human-powered vehicle with the identification information and the degree of wear for the worn portion shown in each of the first images and designating the position of the worn portion within the first image. The training data may be created by first images collected from the owners of or maintenance staffs for the human-powered vehicles.

Figure 7:
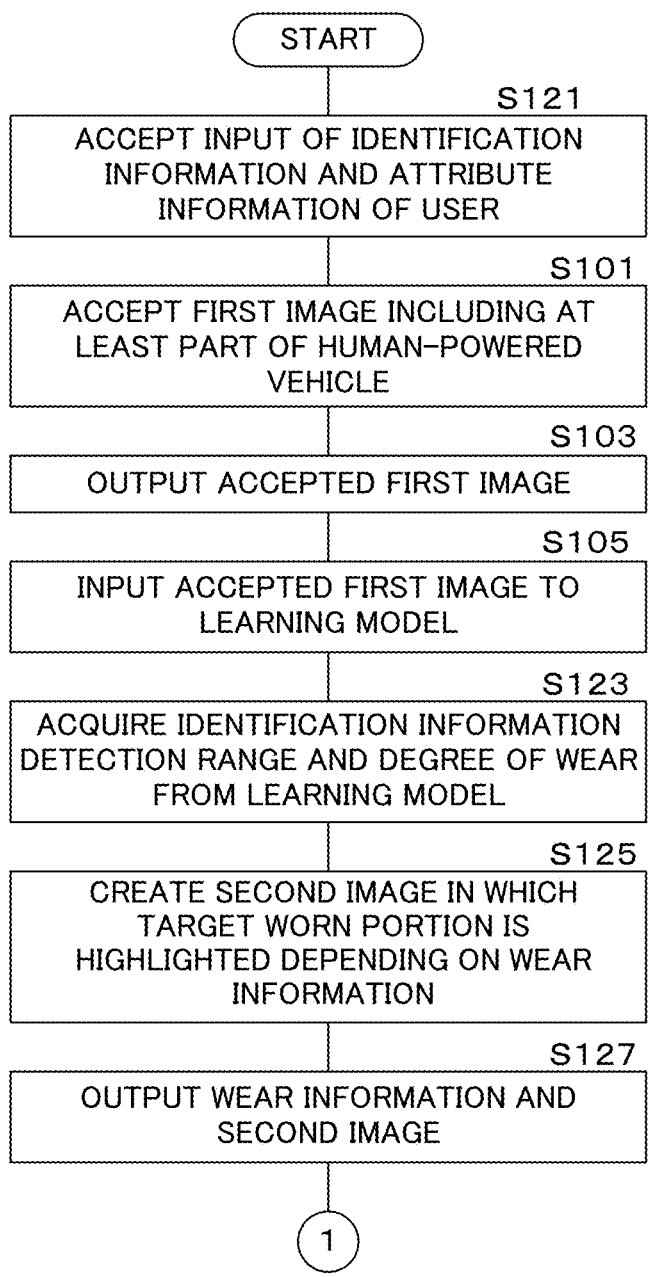
FIG. 7 is a flowchart showing one example of a processing procedure performed by the detecting device using the learning model in Embodiment 2.
Figure 8:
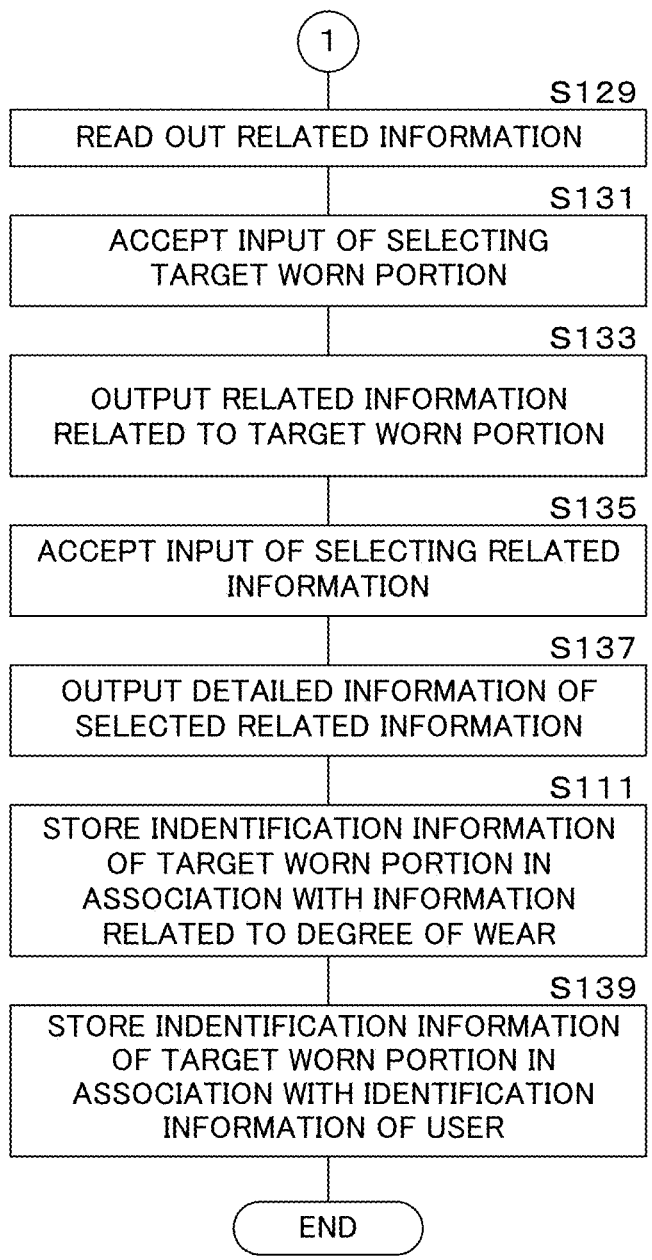
FIG. 8 is a continuation of the flowchart of FIG. 7 showing one example of the processing procedure performed by the detecting device using the learning model in Embodiment 2.

FIGS. 7 and 8 are flowcharts showing an example of a processing procedure performed by the detecting device 1 using the learning model 1M in Embodiment 2. In the processing procedure of the flowcharts shown in FIGS. 7 and 8, steps common to the processing procedure shown in the flowchart shown in FIG. 4 in Embodiment 1 are denoted by the same step numbers, and the detailed description thereof will not be repeated.

The control unit 100 of the detecting device 1 in Embodiment 2 accepts input of the identification information and attribute information of the user (step S121) and accepts a first image (S101).

The acceptance of the identification information at step S121 may be performed only at the initial activation of the computer program 1P, or may be performed at every time the detection processing is performed. The identification information of the user may be a name or a nickname. Alternatively, at step S121, the control unit 100 may accept input by the user selecting any one of the identification information of the multiple users stored in the storage unit 102.

The learning model 1M in Embodiment 2 outputs the identification information of the detected worn portion, the degree of accuracy, the detection range of the worn portion and the degree of wear in accordance with the input of the first image at step S105. The control unit 100 acquires the identification information for which the degree of accuracy outputted from the learning model 1M is equal to or more than a predetermined value, the corresponding detection range, and the degree of wear (step S123).

The control unit 100 changes the highlight method for a target worn portion depending on the wear information. More specifically, the control unit 100 creates a second image in which the target worn portion is featured in accordance with the detected position, the width and the height, within the first image, that are included in the information on the acquired detection range (step S125).

The second image created at step S125 is acquired by superimposing a box surrounding a component of the worn portion on the first image, for example. The highlight method changed depending on the degree of wear is identified by the color, the thickness and the presence or absence of blinking of the box. For example, the control unit 100 creates the second image in which the box is made red, bold or is made to blink if the degree of wear for the worn portion is high to require for the component related to the worn portion to be replaced, while it creates the second image in which the box is made green, thin or is not made to blink if the degree of wear is low to eliminate the need for replacement of the mechanical part. The second image is acquired by superimposing an outline on the component of the worn portion displayed on the first image, for example. The second image is an image of a speech balloon deriving from the component of the worn portion, for example. The second image is acquired by superimposing a translucent image over the range of the component of the worn portion displayed on the first image, for example. The second image may include a character string. The color, the thickness or the motion of the outline, the speech balloon, the translucent image or the character string may be changed depending on the degree of wear.

The control unit 100 that outputs the second image in which the target worn portion is featured outputs the related information related to the degree of wear for the worn portion together with the second image (step S127). At step S127, the control unit 100 causes the display unit 104 to display the wear information and the second image.

The processing procedure is continued from step S127 in FIG. 7 to step S129 in FIG. 8, as indicated by the circled numeral 1 in FIGS. 7 and 8. The control unit 100 reads out the related information related to the won portion corresponding to the acquired identification information from the storage unit 102 (step S129).

The control unit 100 accepts input of selecting the target worn portion as a selected worn portion on the second image in which the target worn portion is featured (step S131). The control unit 100 outputs the related information related to the selected worn portion (step S133). The control unit 100 causes the display unit 104 to display the related information at step S133. The related information may be outputted to the external device via the input-output unit 110, or may be print output or voice output, not limited to be outputted to the display unit 104.

Multiple related information may be outputted at step S133. The control unit 100 accepts input of selecting the related information related to the worn portion as selected related information (step S135). The control unit 100 outputs the detailed information of the selected related information (step S137). At step S137, the control unit 100 causes the display unit 104 to display the detail of the related information.

The control unit 100 stores the identification information of the target worn portion in association with the information related to the degree of wear in the storage unit 102 (step S111). The control unit 100 stores the identification information of the target worn portion in association with the identification information of the user of the human-powered vehicle in the storage unit 102 (step S139), and ends the processing. At step S137, the control unit 100 may only store the worn portion selected at step S131. The worn portion is stored in association with the identification information of the user, which enables storing according to the user's favor such as information on which worn portion is weighted for the user.

Figure 9:
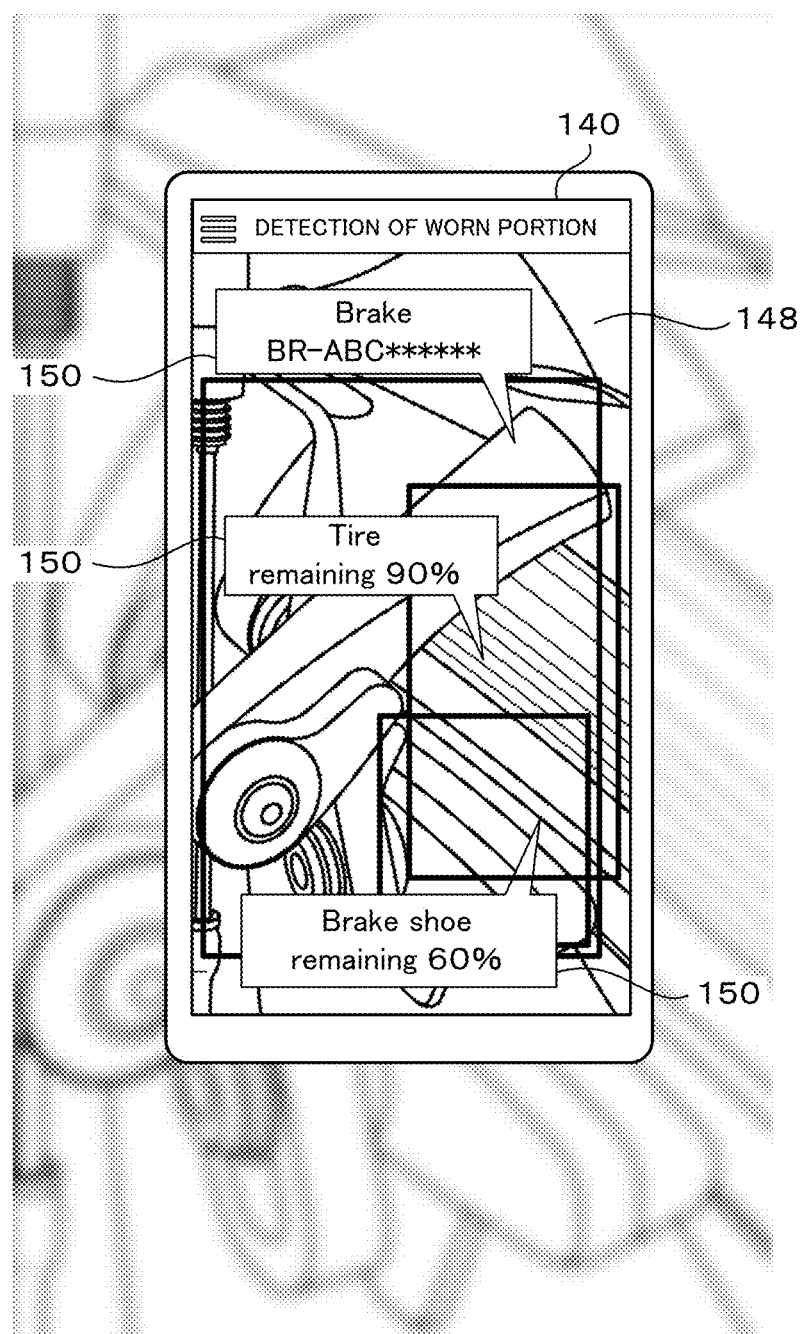
FIG. 9 illustrates an output example of wear information displayed on a display unit of the detecting device in Embodiment 2.

FIG. 9 illustrates a display example of the wear information displayed on the display unit 104 of the detecting device 1 in Embodiment 2. FIG. 9 illustrates one example of an application screen 140 to be displayed on the display unit 104. The application screen 140 includes a second image 148 in which the brake shoe and tires corresponding to the worn portions, and the components including the worn portions are featured. The display unit 104 displayed the target worn portions to being selectable as selected worn portions on the second image 148 in which the target worn portions are featured. Any object 150 corresponding to the target worn portion included in the second image 148 can be selected via a touch panel device included in the display unit 104. In the example in FIG. 9, the detected two worn portions and the components are highlighted so as to be surrounded by the detection frames, and the selectable objects 150 are represented by speech balloons.

Figure 10:
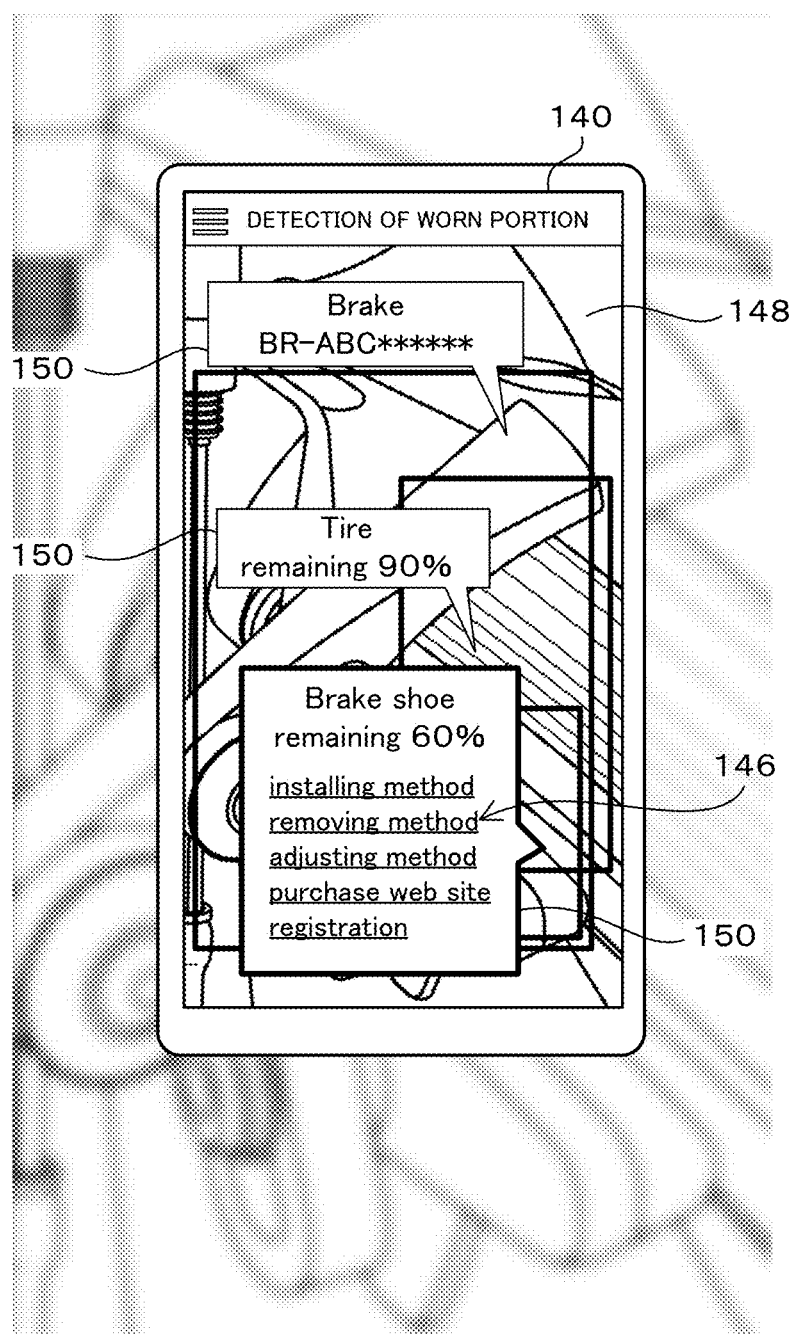
FIG. 10 illustrates an output example of related information displayed on the display unit of the detecting device in Embodiment 2.

FIG. 10 illustrates a display example of the related information displayed on the display unit 104 of the detecting device 1. If the "brake shoe" is selected from the two worn portions displayed on the example in FIG. 9, a menu 146 is displayed within the object 150 for the user to select at least any one of the "installing method," "removing method," "adjusting method," "purchase web site" and "registration" of the brake shoes as related information as illustrated in FIG. 10. As illustrated in FIG. 10, the control unit 100 outputs the related information as text data and/or graphical data, such as a character string or an image.

Figure 11:
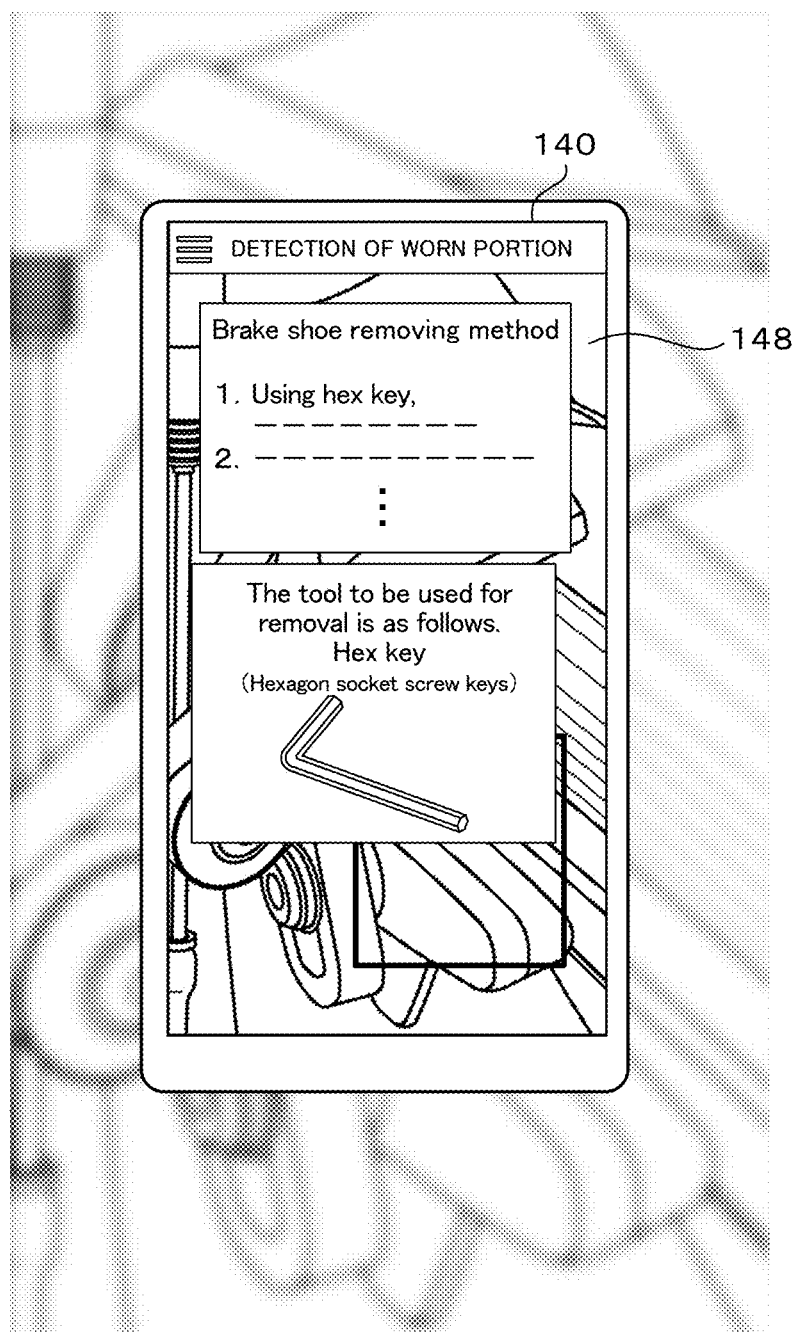
FIG. 11 illustrates another output example of the related information displayed on the display unit of the detecting device in Embodiment 2.

FIG. 11 illustrates another display example of the related information displayed on the display unit 104 of the detecting device 1. FIG. 11 is a display example displayed when the "removing method" of the "brake shoe" is selected from the menu 146 displayed in the example in FIG. 10. If the "removing method" is selected, information on the tool required for removal is displayed. As illustrated in FIG. 11, the control unit 100 outputs the detailed information of the related information as text data and/or graphical data, such as a character string or an image.

The user activates the computer program 1P by using a smartphone or a tablet terminal, thereby readily obtain the degree of wear for a worn portion and the related information of the worn portion from the image of the human-powered vehicle. In Embodiment 2, the detecting device 1 detects the position of a worn portion as well to thereby display the second image with the worn portion featured, which allows the user to readily recognize the detected worn portion and the related information.

Embodiment 3

In Embodiment 3, the physical information or the attribute information of the user are used as input information to be input to the learning model 1M for outputting wear information related to the degree of wear. The learning model 1M in Embodiment 3 is trained to output the ratio indicating the remaining amount as the wear information related to the degree of wear. Since the detecting device 1 in Embodiment 3 is similar in configuration to that in Embodiment 1 except for the learning model 1M and the details of the processing, common parts are denoted by similar reference codes and detailed description thereof will not be repeated.

Figure 12:
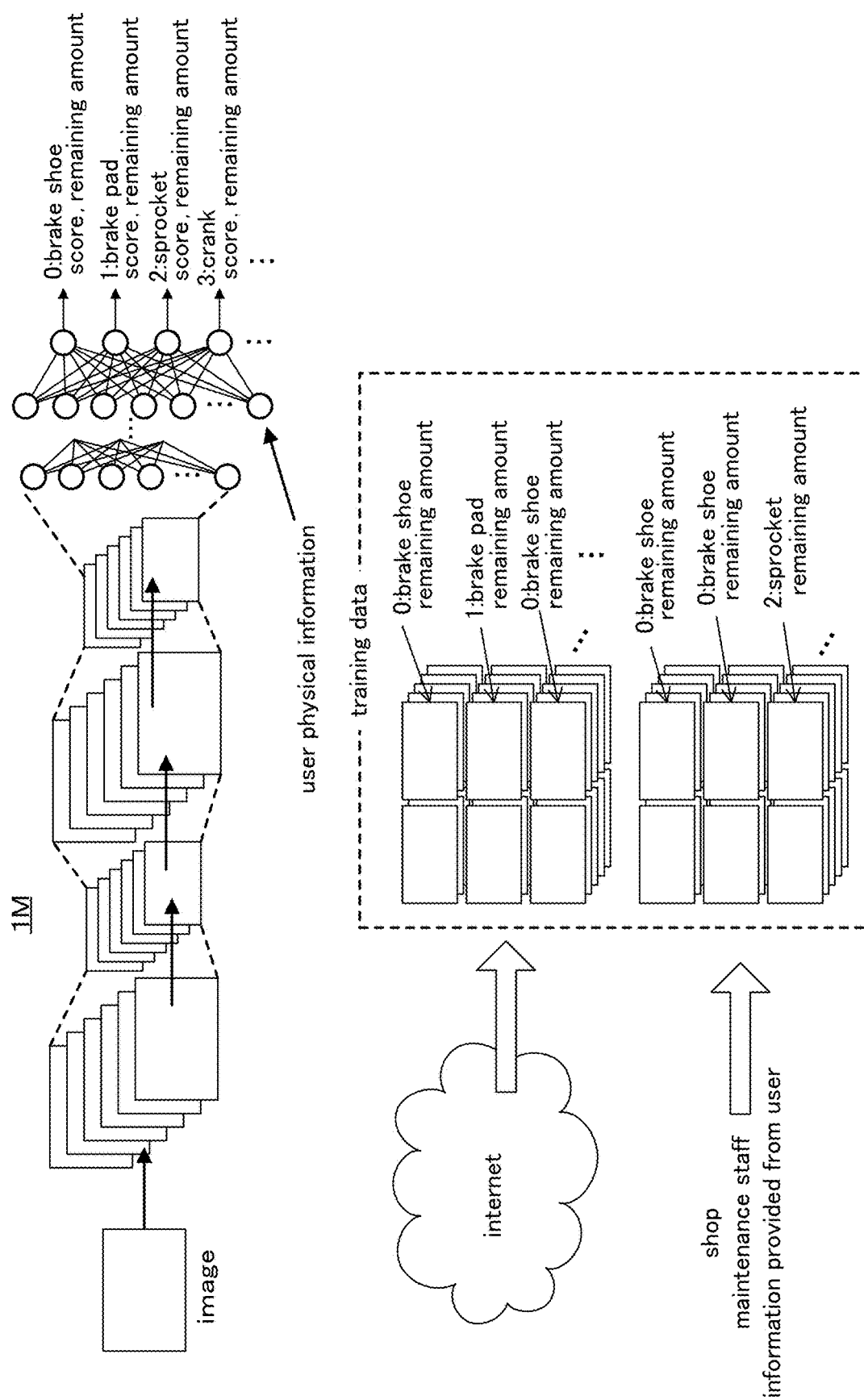
FIG. 12 illustrates the outline of a learning model in Embodiment 3.

FIG. 12 illustrates the outline of the learning model 1M in Embodiment 3. The learning model 1M is trained by a deep learning algorithm using an NN similar to the learning model 1M illustrated in FIG. 2 of Embodiment 1. The learning model 1M in Embodiment 3 outputs the wear information related to the degree of wear in accordance with the input first image and user information including the physical information or the attribute information of the user of the human-powered vehicle. The physical information is the weight, for example, and is inputted at a stage of a layer from which the features of the first image are outputted as illustrated in FIG. 12.

Figure 13:
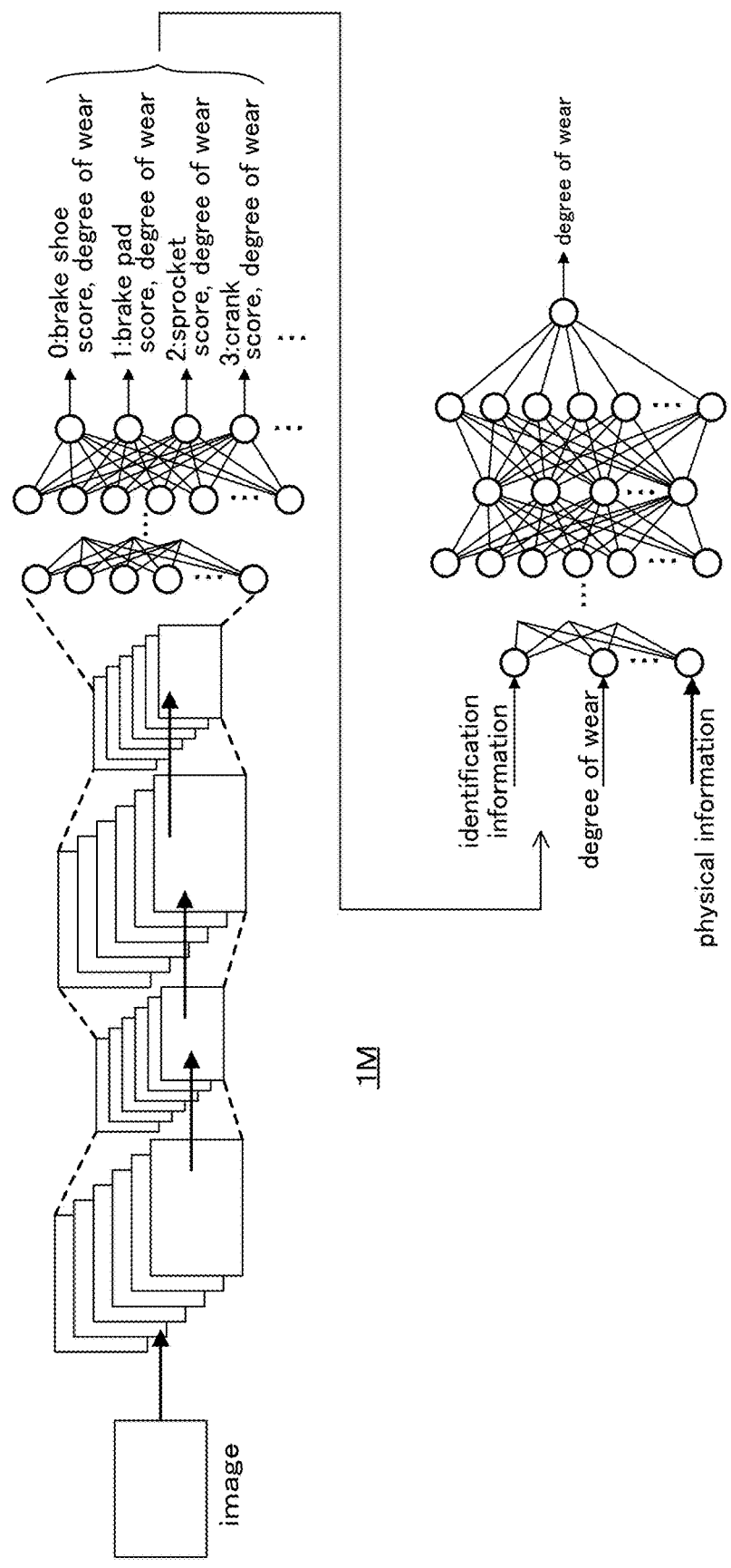
FIG. 13 illustrates another example of the configuration of the learning model in Embodiment 3.

FIG. 13 illustrates another example of the configuration of the learning model 1M in Embodiment 3. The learning model 1M may be configured to include a first model using an NN that outputs a worn portion and the degree of wear in accordance with input of a first image and a second model using an NN that outputs the degree of wear taking the physical information of the worn portion into account in accordance with the identification information of the worn portion and the degree of wear that are output from the first model and the physical information. If the learning model 1M in FIG. 13 is used, the control unit 100 acquires the identification information of the worn portion from the first model and acquires the degree of wear from the second model.

Figure 14:
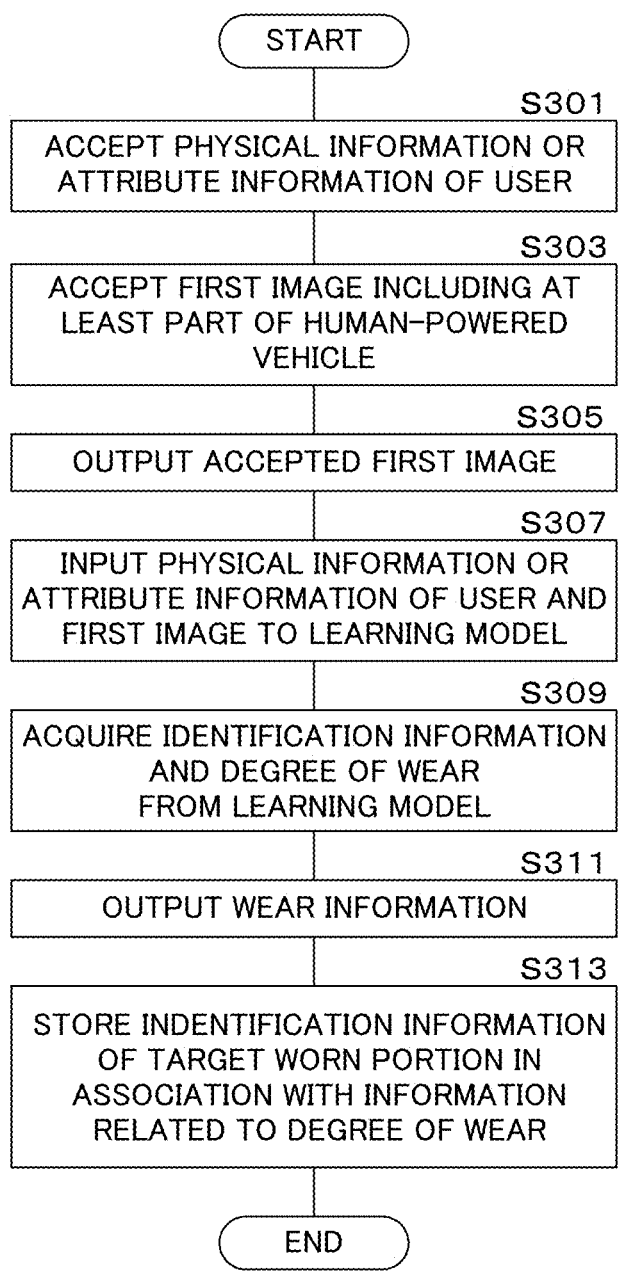
FIG. 14 is a flowchart showing one example of a processing procedure performed by a detecting device in Embodiment 3.

FIG. 14 is a flowchart showing one example of a processing procedure performed by the detecting device 1 according to Embodiment 3. When the user carrying the detecting device 1, which is a smartphone, or a maintenance staff for the human-powered vehicle carrying the detecting device 1 activates the computer program 1P, the control unit 100 executes the following processing.

The control unit 100 accepts the physical information or the attribute information of the user of the human-powered vehicle (step S301). The control unit 100 may accept the identification information of the user and the user information via the operating unit 106 of the display unit 104, or may read out the identification information of the user and the user information that have already been stored in the storage unit 102.

The control unit 100 accepts a first image including a human-powered vehicle ridden by the user (step S303).

The control unit 100 outputs the accepted first image (step S305). At step S305, the control unit 100 causes the display unit 104 to display the first image.

The control unit 100 inputs the accepted physical information or attribute information of the user and the first image to the trained learning model 1M (step S307).

The learning model 1M in Embodiment 3 detects a worn portion of the human-powered vehicle as a target worn portion in accordance with the input of the physical information or the attribute information of the user and the first image, and outputs the identification information of the target worn portion and the degree of wear taking the physical information or the attribute information into account. The control unit 100 acquires the identification information of the worn portion and the degree of wear from the learning model 1M (step S309). By steps S307 and S309, the control unit 100 detects the worn portion of the human-powered vehicle as a target worn portion.

The control unit 100 outputs the wear information related to the worn portion corresponding to the acquired identification information and the degree of wear (step S311). At step S311, the control unit 100 causes the display unit 104 to display the wear information. At step S311, the control unit 100 may display a character string indicating the wear information in such a manner as to be superimposed on the first image. The output of the wear information may be outputted to the external device via the input-output unit 110, or may be print output or voice output, not limited to be outputted to the display unit 104.

The control unit 100 stores the identification information of the target worn portion in association with the information related to the degree of wear that is outputted at step S311 in the storage unit 102 (step S313), and ends the processing.

The detecting device 1 in Embodiment 3 can more accurately output the degree of wear using the physical information of the user of the human-powered vehicle as well as the image of the human-powered vehicle.

Embodiment 4

Figure 15:
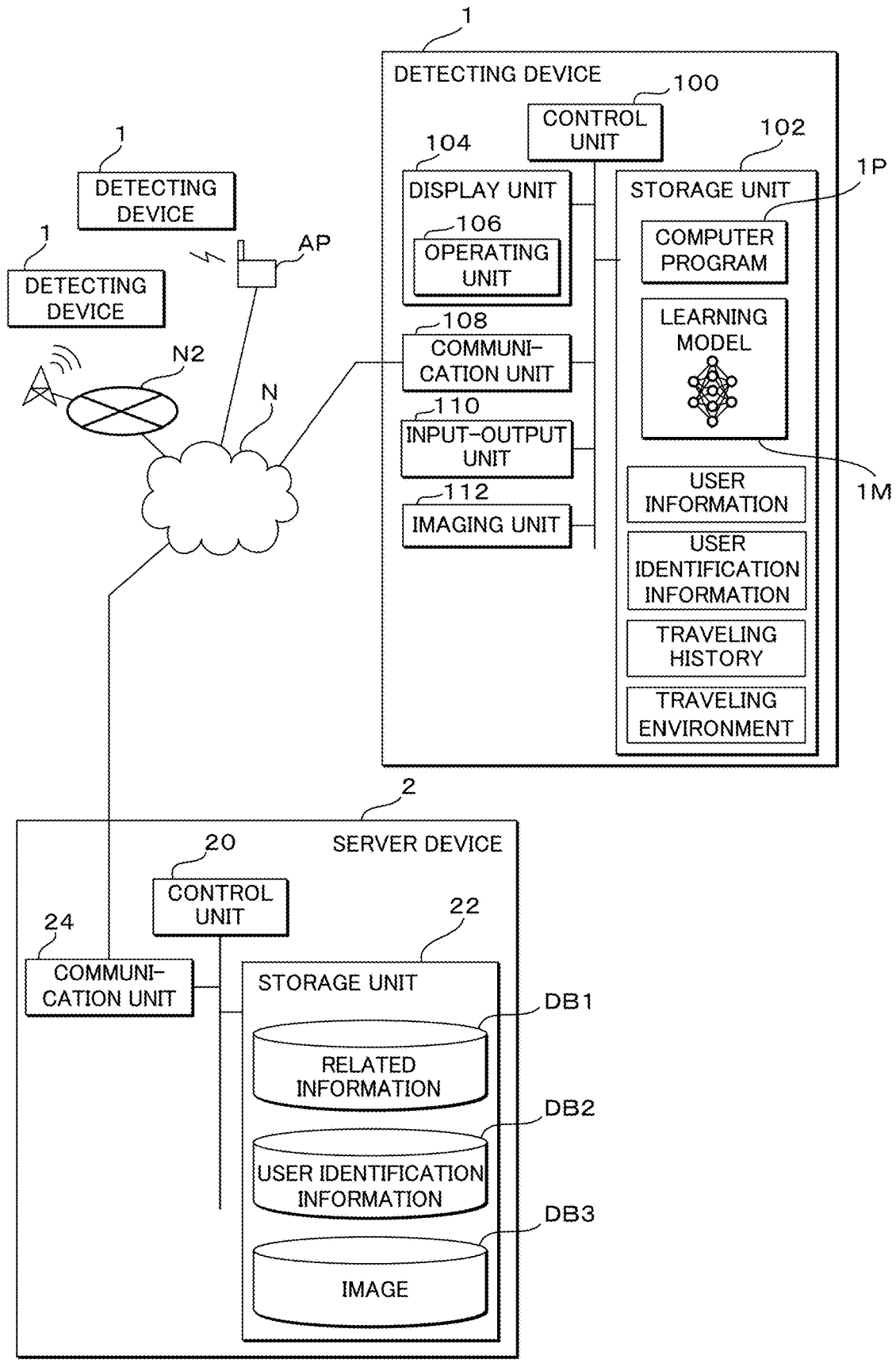
FIG. 15 is a block diagram illustrating the configuration of a system including a detecting device and a server device in Embodiment 4.

In Embodiment 4, related information is stored in a server device 2 that can be connected to communicate with a detecting device 1. The detecting device 1 thus acquires the related information from the server device 2. FIG. 15 is a block diagram illustrating the configuration of a system including the detecting device 1 and the server device 2 in Embodiment 4. Since a part of the configuration of the detecting device 1 in Embodiment 4 is similar to that of Embodiment 1 or Embodiment 2, common parts of the configuration are denoted by similar reference codes, and detailed description thereof will not be repeated.

The detecting device 1 in Embodiment 4 includes a control unit 100, a storage unit 102, a display unit 104, a communication unit 108, an input-output unit 110 and an imaging unit 112.

In the storage unit 102 of the detecting device 1 of Embodiment 4, no related information is stored. The related information stored in the server device 2 is used. The storage unit 102 stores a traveling history of the human-powered vehicle of the user of the detecting device 1, which is a smartphone. The storage unit 102 also stores traveling environment information indicating traveling environment of the human-powered vehicle. The traveling environment includes information on the type of a road surface for traveling specified by position information and information on the weather. In the first example, the traveling history and the traveling environment are information acquired from a cycle computer of the human-powered vehicle through the input-output unit 110 or another wireless communication module. Alternatively, the traveling history and the traveling environment may be acquired by the control unit 100 of the detecting device 1 performing a measurement in accordance with another computer program.

The communication unit 108 of the detecting device 1 in Embodiment 4 may be connected to a public communication network N via an access point AP using a wireless communication device complying with Wi-Fi. The communication unit 108 may be a carrier communication module for achieving communication via a carrier network N2.

A server computer is used for the server device 2. The server device 2 includes a control unit 20, a storage unit 22 and a communication unit 24. The server device 2 will be described using one server computer, though multiple server computers may be used to share the function or processing.

The control unit 20 is a processor using a CPU or a GPU. The control unit 20 executes processing using a memory such as a built-in ROM, RAM, or the like.

The storage unit 22 includes a non-volatile memory, for example, a hard disk, a solid state drive (SSD), or the like. The storage unit 22 stores a server program 2P. The control unit 20 reads out and executes the server program 2P.

The storage unit 22 includes a related information database DB1, a user identification information database DB2 and an image database DB3. The related information database DB1 includes information related to a worn portion that is detected. The related information database DB1 includes at least one of the information on the type of the detected worn portion, an installing method for a component related to the worn portion, an removing method for a component related to the worn portion, and an adjusting method for a component related to the worn portion. The information on an installing method may include at least one of the information on a component for installing the component related to the detected worn portion in the worn portion and the information on a tool required for installing or removing the worn related to the detected worn portion. The related information database DB1 may include information on a replacement to be replaced with the component related to the detected worn portion. The information on a replacement may include information on another component that is required when the component at a worn portion is replaced with such replacement. The related information database DB1 includes link information for allowing the user to access a web site to purchase an item related to the worn portion. The user identification information database DB2 includes information on the name, nickname, user ID and e-mail address of the user of the human-powered vehicle. The image database DB3 includes information related to an image including a human-powered vehicle.

The communication unit 24 is a communication module that can be connected to communicate with a public communication network N. The communication unit 24 is a network card for wired connection. The control unit 20 transmits and receives information with the detecting device 1 by the communication unit 24.

Figure 16:
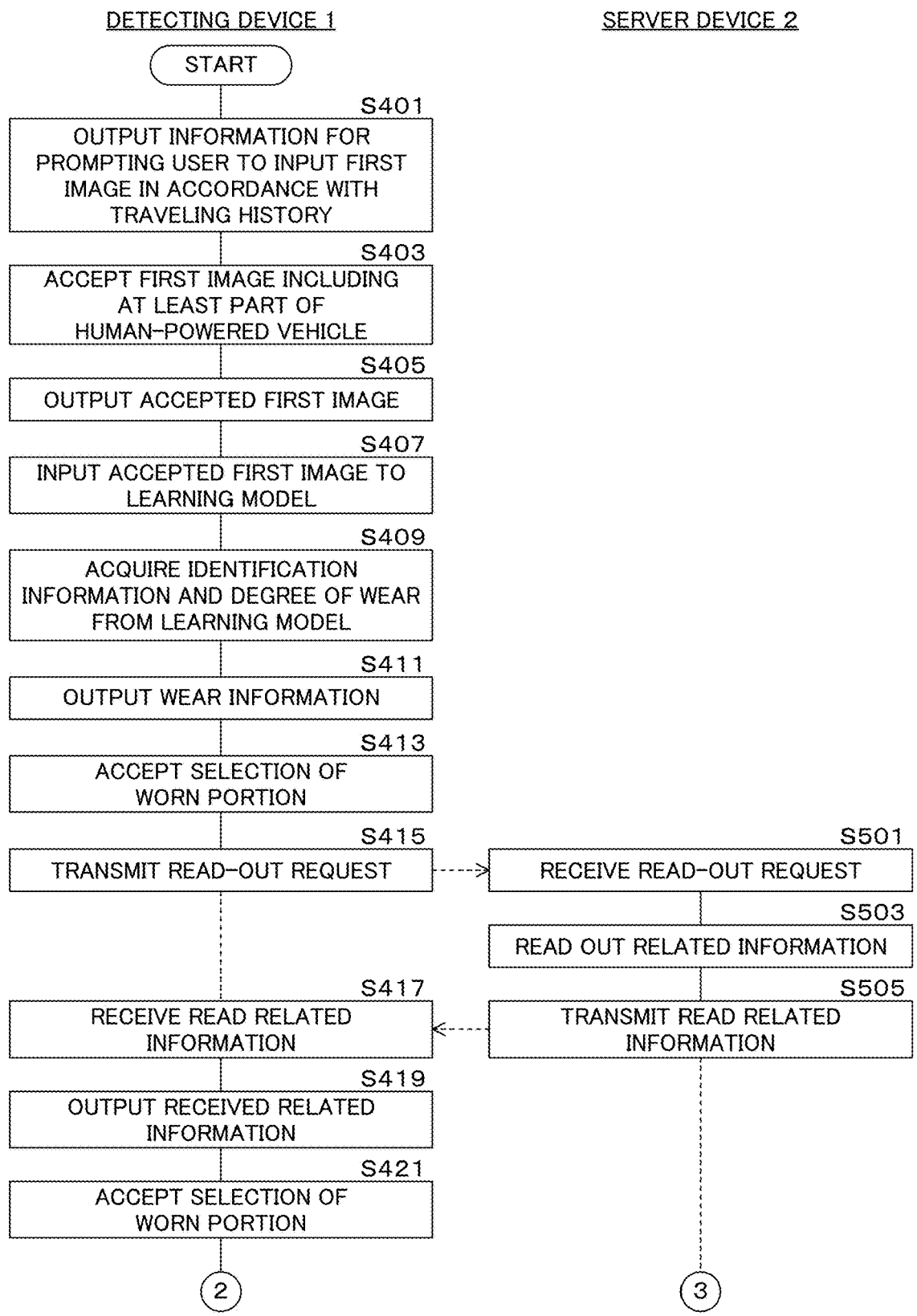
FIG. 16 is a flowchart showing one example of a processing procedure in Embodiment 4.
Figure 17:
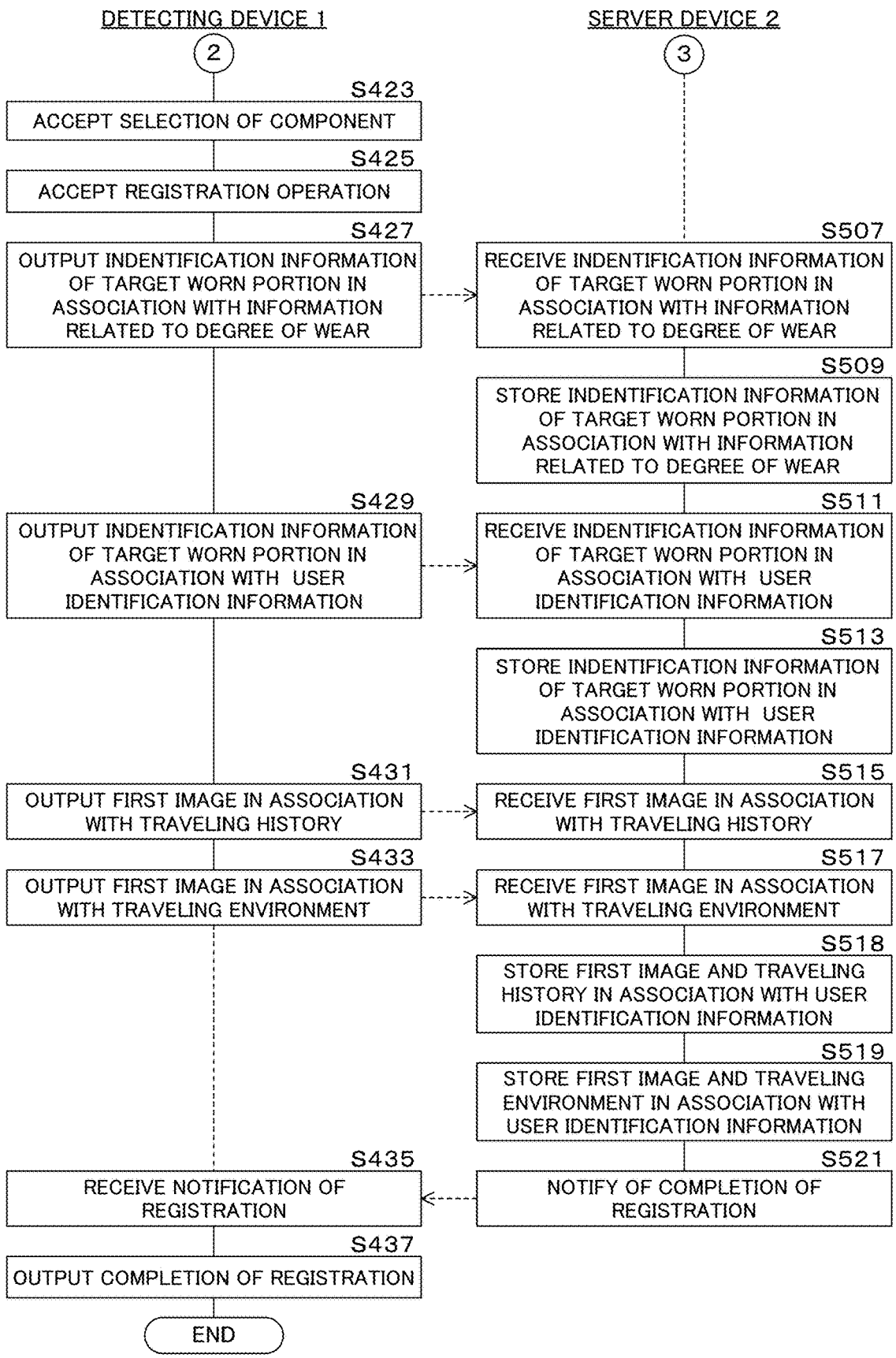
FIG. 17 is a continuation of the flowchart FIG. 16 showing one example of the processing procedure in Embodiment 4.

FIG. 16 and FIG. 17 are flowcharts showing one example of a processing procedure in Embodiment 4. When the user carrying the detecting device 1, which is a smartphone, or a maintenance staff for the human-powered vehicle carrying the detecting device 1 activates a computer program 1P, the control unit 100 executes the following processing.

The control unit 100 of the detecting device 1 outputs information for prompting the user to input the first image to the display unit 104 in accordance with the traveling history of the human-powered vehicle (step S401). The output destination at step S401 is not limited to the display unit 104, and may be a voice input-output unit provided in the detecting device 1 used for performing voice output.

The control unit 100 accepts a first image including the human-powered vehicle (step S403). At step S403, the control unit 100 activates the imaging unit 112 to accept image output. Alternatively, having stored first images acquired by the imaging unit 112 in advance in the storage unit 102, the control unit 100 may read out a selected one of the first images from the storage unit 102 to thereby accept the first image at step S403.

The control unit 100 outputs the accepted first image (step S405). At step S405, the control unit 100 causes the display unit 104 to display the first image.

The control unit 100 inputs the accepted first image to the trained learning model 1M (step S407). The learning model 1M in Embodiment 4 detects a worn portion as a target worn portion in accordance with the input of the first image, and outputs the identification information and the degree of wear corresponding to the target worn portion. The control unit 100 acquires the identification information and the degree of wear corresponding to the worn portion that are outputted from the learning model 1M (step S409).

The control unit 100 outputs the wear information related to the worn portion corresponding to the acquired identification information and the degree of wear (step S411). At step S411, the control unit 100 displays the wear information for respective worn portions in a selectable manner on the display unit 104. The control unit 100 accepts selection of any of the wear information for the worn portions (step S413).

The control unit 100 transmits a read-out request for the related information related to the worn portion that includes the identification information of the selected worn portion from the communication unit 108 to the server device 2 (step S415).

The server device 2 receives the read-out request for the related information by the communication unit 24 (step S501), and the communication unit 20 reads out the related information of the worn portion corresponding to the identification information of the worn portion included in the read-out request from the storage unit 22 (step S503). At step S503, the control unit 20 may read out the link information for allowing the user to access the web site to purchase an item related to the worn portion stored in the storage unit 22. The control unit 20 transmits the read related information to the detecting device 1 (S505).

The detecting device 1 receives the related information transmitted from the server device 2 (step S417), and the control unit 100 outputs the related information of the worn portion corresponding to the identification information of the target worn portion (step S419).

The control unit 100 accepts selection of any one of the worn portions (step S421), and outputs the details of the related information of the selected worn portion to the display unit 104 (step S423). For detecting device 1, the processing procedure is continued from step S421 in FIG. 16 to step S423 in FIG. 17, as indicated by the circled numeral 2 in FIGS. 16 and 17.

The control unit 100 accepts registration operation through a menu 146 being the related information concerning the selected target worn portion (step S425). The control unit 100 outputs the identification information of the target worn portion to the external device (server device 2) in association with the information related to the degree of wear (step S427). The control unit 100 outputs the identification information of the target worn portion to the external device (server device 2) in association with the identification information of the user of the human-powered vehicle (step S429).

The control unit 100 outputs the inputted first image to the external device (server device 2) in association with the traveling history of the human-powered vehicle (Step S431). At step S431, the control unit 100 outputs, regarding the selected target worn portion, the first image accepted at step S403 to the external device (server device 2) in association with the traveling history of the human-powered vehicle stored in the storage unit 102.

The control unit 100 outputs the first image to the external device (server device 2) in association with the worn environment of the human-powered vehicle (Step S433). At step S433, the control unit 100 outputs, regarding the selected target worn portion, the first image accepted at step S503 to the external device (server device 2) in association with the traveling environment of the human-powered vehicle stored in the storage unit 102.

The processing procedures at steps S431 and S433 are not necessarily performed, and any one of the processing procedures may be performed.

For server device 2, the processing procedure is continued from step S505 in FIG. 16 to step S507 in FIG. 17, as indicated by the circled numeral 3 in FIGS. 16 and 17. The server device 2 receives the information related to the degree of wear in association with the identification information of the target worn portion (step S507), and the control units 20 stores the identification information of the target worn portion and the information on the degree of wear in the storage unit 22 (step S509). The control unit 20 receives the identification information of the target worn portion in association with the identification information of the user (step S511), and stores the identification information of the target worn portion in the user identification information database DB2 of the storage unit 22 in association with the identification information of the user (step S513).

At step S513, the control unit 20 may store the correspondence with the related information. Here, if outputting the link information for a web site to purchase an item related to the worn portion as related information, the control unit 20 may store the purchase history and the purchase time at this site in the user identification information database DB2 of the storage unit 22 in association with the identification information of the user. The storage unit 20 may store the replacement time of a replacement at the worn portion in the user identification information database DB2 of the storage unit 22. The control unit 20 can read out and output the related information on which the purchase history is reflected as related information designed for each user.

The control unit 20 receives the first image in association with the traveling history (step S515), and receives the first image in association with the traveling environment (step S517). The control unit 20 stores the first image associated with the traveling history in the image database DB3 of the storage unit 22 in association with the identification information of the user (step S518), and stores the first image associated with the traveling environment in the image database DB3 of the storage unit 22 in association with the identification information of the user (step S519). The control unit 20 notifies the detecting device 1 of completion of the registration (step S521), and ends the processing.

When receiving the notification of registration (step S435), the detecting device 1 outputs the completion of registration to the display unit 104 (step S437), and ends the processing.

At step S518, the first image is stored in the server device 2 in association with the traveling history, that is, the information on how far the human-powered vehicle travels. The information stored at step S518 may be used for notifying the user how much the component is worn. The information stored at step S518, that is, the first image of the worn or dirty portion may be used as training data for retraining the learning model 1M aside from the first image of a new component at the same portion.

At step S519, the first image is stored in the server device 2 in association with the traveling environment, that is, the information on what environment the human-powered vehicle travels. The information stored at step S519 may be used for retraining the learning model 1M by using the first image of the component as training data for each training environment.

Embodiment 4 is configured to allow the server device 2 to store the related information, and thus the related information is read out from the server device 2. The server device 2 may also store the learning model 1M. The detecting device 1 may acquire the information on the identification information that is output from the learning model 1M and use the information for the detection processing. Here, the server device 2 updates the learning model 1M by the first images collected from multiple detecting devices 1, which shows promise for more accurate detection.

It is to be understood that the embodiments disclosed here is illustrative in all respects and not restrictive. The scope of the present invention is defined by the appended claims, and all changes that fall within the meanings and the bounds of the claims, or equivalence of such meanings and bounds are intended to be embraced by the claims.

DESCRIPTION OF REFERENCE CHARACTERS

1 . . . detecting device
100 . . . control unit
102 . . . storage unit
104 . . . display unit
106 . . . operating unit
108 . . . communication unit
110 . . . input-output unit
112 . . . imaging unit
114 . . . training computing device
1P . . . computer program
1M . . . learning model
2 . . . server device
20 . . . control unit
22 . . . storage device
24 . . . communication unit
5 . . . storage medium
5P . . . computer program
5M . . . machine learning model

The invention claimed is:

1. A detecting device comprising:
a control unit including processing circuitry configured to execute a machine learning model, wherein
the control unit is configured to detect via the machine learning model, in a first image including at least a part of a human-powered vehicle, a worn portion of the human-powered vehicle that is classified as a target worn portion, and
the machine learning model is trained to output wear information related to a degree of wear for the detected target worn portion in response to a run-time input of the first image,
the control unit outputs related information related to the detected target worn portion, and
the related information includes at least one of an installing method for a component related to the target worn portion, a removing method for a component related to the target worn portion, and an adjusting method for a component related to the target worn portion.

2. The detecting device according to claim 1, wherein
the worn portion is one of a plurality of worn portions in the first image,
the target worn portion is one of a plurality of defined target worn portions; and
the control unit detects the plurality of worn portions in the human-powered vehicle from the first image as the plurality of target worn portions, and outputs associated wear information for each of the plurality of detected target worn portions.

3. The detecting device according to claim 1, wherein
the worn portion includes a component of the human-powered vehicle, and
the control unit detects a component of the human-powered vehicle from the first image as the target worn portion.

4. The detecting device according to claim 3, wherein the component includes at least one of a sprocket assembly, a crank assembly, a chain, a disk brake rotor, a rim, and a wire.

5. The detecting device according to claim 1, wherein a training computing device trains the machine learning model with training data obtained by labeling training data images including at least one of a brake shoe, a brake pad, a disk brake rotor, and a rim with a degree of abrasion.

6. The detecting device according to claim 1, wherein a training computing device trains the machine learning model with training data obtained by labeling training data images including at least one of a sprocket assembly and a crank assembly with a degree of abrasion.

7. The detecting device according to claim 1, wherein a training computing device trains the machine learning model with training data obtained by labeling training data images including at least one of a chain and a wire with a degree of extension.

8. The detecting device according to claim 1, wherein a training computing device trains the machine learning model with training data obtained by labeling training data images including a tire with a depth of ridges.

9. The detecting device according to claim 1, wherein a training computing device trains the machine learning model with training data including a plurality of training data images obtained when the worn portion is viewed from different angles.

10. The detecting device according to claim 1, wherein, at run-time, the machine learning model outputs the wear information in response to run-time input of the first image and user information including physical information or attribute information of a user of the human-powered vehicle.

11. The detecting device according to claim 1, wherein the control unit outputs a second image in which the target worn portion is featured.

12. The detecting device according to claim 11, wherein the control unit changes a visual emphasis of the target worn portion depending on the wear information.

13. The detecting device according to claim 1, wherein the information on the installing method includes at least one of information on a component related to the target worn portion for installing the component in the worn portion, and information on a tool for installing or removing the component related to the target worn portion.

14. The detecting device according to claim 1, wherein the related information includes information on a replacement to be replaced with a component related to the target worn portion.

15. The detecting device according to claim 14, wherein the information on a replacement includes information on another component required when a component related to the target worn portion is replaced with the replacement.

16. The detecting device according to claim 1, wherein the related information includes link information to access a web site for purchasing an item related to the target worn portion detected.

17. The detecting device according to claim 1, wherein the control unit outputs the related information as text data and/or graphical data.

18. The detecting device according to claim 1, further comprising a display unit that displays information output from the control unit.

19. The detecting device according to claim 18, wherein
the display unit receives user input of selected related information related to the target worn portion, and
the control unit outputs detailed information of the selected related information.

20. The detecting device according to claim 18, wherein
the display unit is configured to select the target worn portion as a selected worn portion on a second image in which the target worn portion is featured, and
the control unit outputs related information of the selected worn portion.

21. The detecting device according to claim 1, further comprising a storage device that stores information output from the control unit.

22. The detecting device according to claim 21, wherein the control unit stores identification information of the target worn portion in the storage device in association with information related to the degree of wear.

23. The detecting device according to claim 21, wherein the control unit stores identification information of the target worn portion in the storage device in association with identification information of a user of the human-powered vehicle.

24. The detecting device according to claim 1, wherein the control unit outputs identification information of the target worn portion in association with the information related to the degree of wear to an external device.

25. The detecting device according to claim 1, wherein the control unit outputs identification information of the target worn portion in association with identification information of a user of the human-powered vehicle to an external device.

26. The detecting device according to claim 1, wherein the control unit outputs information for prompting a user to input the first image in accordance with a traveling history of the human-powered vehicle.

27. The detecting device according to claim 1, wherein the control unit outputs the first image input to an external device, in association with a traveling history of the human-powered vehicle.

28. The detecting device according to claim 1, wherein the control unit outputs the first image as input to an external device, in association with traveling environment information indicating traveling environment of the human-powered vehicle.

29. A detection method executable by a processor, the method comprising:
detecting, by a control unit via a machine learning model, a worn portion in a human-powered vehicle from a first image including at least a part of the human-powered vehicle as a target worn portion;
in response to a run-time input of the first image, outputting, by the machine learning model, wear information related to a degree of wear for the target wear portion; and
outputting, by the control unit, related information related to the detected target worn portion, wherein
the related information includes at least one of an installing method for a component related to the target worn portion, a removing method for a component related to the target worn portion, and an adjusting method for a component related to the target worn portion.

30. A method for generating a machine learning model, the method comprising:
creating training data obtained by labeling a plurality of training data images, each including at least a part of a human-powered vehicle, with a wear portion of the human-powered vehicle and a degree of wear; and
generating, based on the created training data, a machine learning model that detects, in response to input of a run-time input image of at least a portion of the human-powered vehicle, a worn portion of the human-powered vehicle in the run-time image as a target worn portion, and outputs wear information related to a degree of wear for the target worn portion, wherein
related information related to the target worn portion detected by the machine learning model is output by a control unit, the related information including at least one of an installing method for a component related to the target worn portion, a removing method for a component related to the target worn portion, and an adjusting method for a component related to the target worn portion.

31. A non-transitory computer-readable storage medium comprising instructions configured to be executed by a processor of a computer, to cause the processor to execute processing steps of:
detecting, by a control unit via a machine learning model, a worn portion in a human-powered vehicle as a target worn portion from a first image including at least a part of the human-powered vehicle;
in response to a run-time input of the first image, outputting, by a trained machine learning model, wear information related to a degree of wear for the target worn portion; and
outputting, by the control unit, related information related to the detected target worn portion, wherein
the related information includes at least one of an installing method for a component related to the target worn portion, a removing method for a component related to the target worn portion, and an adjusting method for a component related to the target worn portion.

* * * * *